United States Patent [19]

Choi et al.

[11] Patent Number: 5,726,373
[45] Date of Patent: Mar. 10, 1998

[54] VIDEO-SONG ACCOMPANIMENT APPARATUS USING A COMPACT DISC AS A RECORDING MEDIUM

[75] Inventors: Hae-min Choi; Kwang-sik Choi, both of Suwon, Rep. of Korea

[73] Assignee: Samsung Electronics Co., Ltd., Kyungki-do, Rep. of Korea

[21] Appl. No.: 580,344

[22] Filed: Dec. 28, 1995

[30] Foreign Application Priority Data

Dec. 28, 1994 [KR] Rep. of Korea ............... 94-38277

[51] Int. Cl.[6] ................................................ G10H 1/36
[52] U.S. Cl. ........................... 84/609; 84/610; 84/634; 434/307 A
[58] Field of Search ................. 84/602, 609–610, 84/634, 649–650, 666, 477 R, 478, 645, DIG. 6; 434/307 A

[56] References Cited

U.S. PATENT DOCUMENTS

| | | | |
|---|---|---|---|
| 5,233,438 | 8/1993 | Funahashi et al. | 358/341 |
| 5,496,178 | 3/1996 | Back | 434/307 A |
| 5,499,221 | 3/1996 | Ito et al. | 369/32 |
| 5,546,368 | 8/1996 | Lee et al. | 369/47 |

*Primary Examiner*—William M. Shoop, Jr.
*Assistant Examiner*—Marlon T. Fletcher
*Attorney, Agent, or Firm*—Sughrue, Mion, Zinn, Macpeak & Seas, PLLC

[57] ABSTRACT

A CD video-song accompaniment apparatus reproduces information from a compact disc and contains a CD reproducing portion, a CD-OK reproducing portion, and audio selector, and a main controller. The CD reproducing portion reads audio data from the compact disc and generates an audio signal if the compact disc is a first type of compact disc. On the other hand, the CD reproducing portion reads digital data from the compact disc if the compact disc is a second type of compact disc. The CD-OK reproducing portion inputs the digital data, which contains background image data and music information data, generates a first background image and a second background image based on the background image data, and generates a CD-OK audio signal based on the music information data. The audio selector inputs the audio signal generated by the CD reproducing portion and the CD-OK audio signal generated by the CD-OK reproducing portion and selectively outputs either the audio signal or the CD-OK audio signal. The main controller determines whether the compact disc is the first type of compact disc or the second type of compact disc. Subsequently, the main controller instructs the audio selector to output the audio signal if the compact disc is the first type of compact disc and instructs the audio selector to output the CD-OK audio signal if the compact disc is the second type of compact disc.

43 Claims, 24 Drawing Sheets

| S₀S₁ | CNT | ADD | TNO | PNT | M | S | F | Z | PMIN | PSEC | PFRAME | CRC |

2 BITS | 4 BITS | 4 BITS | 4 BITS
72 BITS
16 BITS

| FRAME No. | PNT | PM | PS | PF |
|---|---|---|---|---|
| n<br>n+1<br>n+2 | 01<br>01<br>01 | START POSITION OF FIRST TRACK IN PROGRAM AREA<br>00 | 02 | 32 |
| n+3<br>n+4<br>n+5 | A0<br>A0<br>A0 | FIRST TRACK NUMBER | 00 | 00 |
| n+6<br>n+7<br>n+8 | A1<br>A1<br>A1 | LAST TRACK NUMBER | 00 | 00 |
| n+9<br>n+10<br>n+11 | A2<br>A2<br>A2 | START POSITION OF LOA | | |

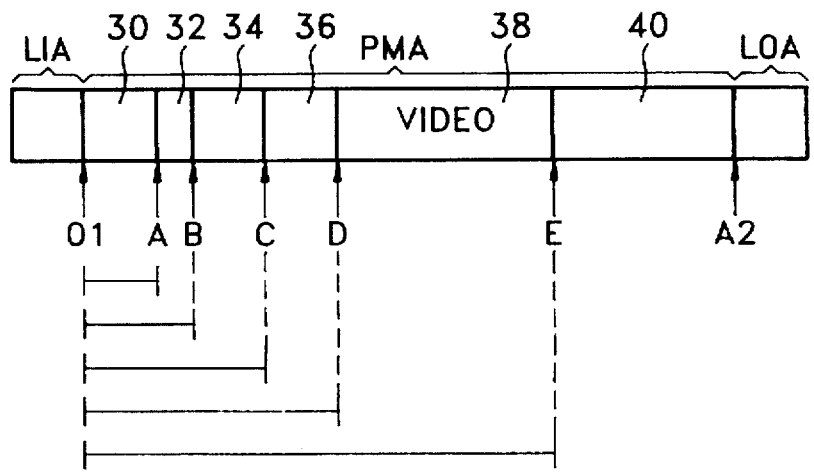
FIG. 3
FIG. 4
FIG. 5
| INDEX | M | S | F | GR | |
|---|---|---|---|---|---|
| 0 0 0 0 | 00 | 02 | 47 | 00 | |
| 0 0 0 1 | 00 | 03 | 40 | 01 | |
| 0 0 0 2 | 6A | 04 | 41 | 01 | G1 |
| 0 0 0 3 | 7B | 05 | 36 | 01 | |
| 0 0 0 4 | 8E | 06 | 19 | 01 | |
| 0 0 0 5 | 8A | 07 | 12 | 01 | |
| 0 0 0 6 | 8B | 08 | 05 | 00 | |
| 0 0 0 7 | 8C | 09 | 02 | 01 | G2 |
| 0 0 0 8 | 8D | 10 | 10 | 01 | |
| 0 0 0 9 | 8E | 14 | 00 | 01 | |
| : | : | : | : | : | |
| 3 9 9 9 | XX | XX | XX | 01 | |
FIG. 6
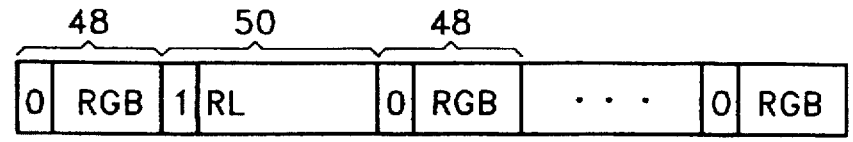

FIG. 8

|  | 58 | 60 | | 62 ⟵37 |
|---|---|---|---|---|
| INDEX | M | S | F | GR |
| 0 0 0 0 | E0 | 00 | 00 | 11 |
| 0 0 0 1 | E0 | 04 | 02 | 12 |
| 0 0 0 2 | E1 | 08 | 12 | 32 |
| 0 0 0 3 | E2 | 0C | 1A | 43 |
| 0 0 0 4 | E3 | 0F | 32 | 53 |
| 0 0 0 5 | E4 | 11 | 0B | 02 |
| 0 0 0 6 | E5 | 15 | 82 | 03 |
| 0 0 0 7 | E6 | 1A | 73 | 04 |
| 0 0 0 8 | E7 | 20 | 09 | 05 |
| 0 0 0 9 | E8 | 26 | C6 | 06 |
| ⋮ | ⋮ | ⋮ | ⋮ | ⋮ |
| 3 9 9 9 | XX | XX | XX | 01 |

FIG. 9

| U\D | 0 | 1 | 2 | 3 | 4 | 5 | 6 | 7 | 8 | 9 |
|---|---|---|---|---|---|---|---|---|---|---|
| 0 | | | FOLK SONG | KIDS' SONG | POP SONG | CAROL | ARMY SONG | THEME SONG | ETC. | |
| 1 (DANCE1) | | PRE '70 | '70~'90 | POST '90 | | | | | | |
| 2 (DANCE2) | | " | " | " | | | | | | |
| 3 (TROT) | | " | " | " | | | | | | |
| 4 (NEW TROT) | | " | " | " | | | | | | |
| 5 (BALLAD1) | | " | " | " | | | | | | |
| 6 (BALLAD2) | | " | " | " | | | | | | |
| 7 | ETC. | " | " | " | | | | | | |
| 8 | | | | | | | | | | |
| 9 | | | | | | | | | | |

VIDEO-SONG ACCOMPANIMENT APPARATUS USING A COMPACT DISC AS A RECORDING MEDIUM

FIELD OF THE INVENTION

The present invention relates to a video-song accompaniment apparatus which reproduces various songs and background images that are recorded on a compact disc. More particularly, the present invention relates to a video-song accompaniment apparatus which reproduces background images and lyrical text from the compact disc and overlays the lyrical text on the background images in synchronicity with a particular song that is simultaneously being reproduced. Furthermore, the compact disc on which the above data is stored is capable of storing data relating to thousands of background images, lyrics, and songs.

BACKGROUND OF THE INVENTION

A conventional song accompaniment apparatus (e.g. a karaoke system) uses a recording medium for recording various images and song data. In particular, the recording medium may include a magnetic tape, a video (laser) disc, or a semiconductor memory. However, each of the conventional recording media has particular disadvantages which contribute to the expense or inconvenience of operating the karaoke system.

For example, a magnetic tape cannot be randomly accessed to randomly search information recorded on the tape. Accordingly, if the karaoke system uses a magnetic tape, the system cannot retrieve data via high-speed search operations, and the data access time of the system is relatively slow.

Also, a video disc is limited with respect to the number of songs which can be recorded on the disc. Specifically, since the motion pictures recorded on the video disc contain a vast amount of data, the video disc is capable of recording only about twenty songs. As a result, although a karaoke system using video discs is able to perform high-speed searches for data stored on the discs, approximately 50 discs are required to store data for 1,000 songs. Thus, a large number of video discs are required to provide a reasonable variety of songs to users of the karaoke system. In addition, since such karaoke system requires many discs, the discs must be frequently changed during the operation of the system. Accordingly, an expensive automatic disc changer must be incorporated into the system.

In addition, the semiconductor memory is an expensive medium on which to record video and audio data. Therefore, even though hundreds of songs can be easily recorded in a semiconductor memory, such recording medium is extremely expensive.

Besides the recording media described above, compact discs (CDs) have been recently introduced as an alternative recording medium for a karaoke system. The CDs used in the karaoke system generally have diameter of 12 cm and can store up to 600 Mb of digital data. Three types of CDs which may be used as a recording medium include a CD-DA disc, a GD-G (or CD-EG) disc, and a CDV disc. The CD-DA disc is a CD which is used to reproduce audio information and thus, only contains audio data. A CD-G (or CD-EG) stores graphical lyrics and background images as well as audio data and thus, contains audio, text, and graphics data. A CDV disc is used to reproduce audio and video information and thus, contains audio and video data.

In addition to the above CDs, data may be stored on a CD-ROM or a CD-I. A CD-ROM disc contains computer data which may be utilized in various database and electronic publishing applications. Also, a CD-I disc is generally utilized in multimedia environments and contains computer, audio, video, and text data.

The recording formats of the CDs described above are based on the recording format of the CD-DA disc. In particular, the data recording area of the CD is generally divided into a lead-in area (LIA), a program area (PMA), and a lead-out area (LOA). The lead-in area (LIA) contains data corresponding to a table of contents for the information stored in the program area (PMA). The program area (PMA) stores the actual data which is to be reproduced from the CD such as audio, video, or text data.

The reproducing apparatus reproduces a particular program from the CD as follows. First, the apparatus searches the lead-in area (LIA) and reads the table of contents information which relates to the particular program. The lead-in area (LIA) may comprise eight subcode channels P, Q, R, S, T, U, V and W, and the table of contents information may be stored in the subcode channel Q and may include song and index numbers for up to 99 different programs. Furthermore, the subcode channel P may be used to store information corresponding to the prelude of a song.. After the table of contents information for the particular program has been read, the apparatus utilizes such information to locate the program in the program area (PMA), and then, the program is reproduced. In addition, CD-G discs are provided with graphics functions which are used to display the lyrics and background images of a song in a karaoke system. Therefore, a CD-G disc may use the subcode channels R to W to display such graphical data. Also, since a CD-DA disc only stores audio data, the subcode channels R to W are not used in the CD-DA disc.

In a CD-DA or CD-G disc, since the apparatus uses the table of contents information in the lead-in area (LIA) to locate and reproduce the particular program stored in the program area (PMA), the number of programs which can be stored in the program area (PMA) is somewhat limited. Specifically, a single CD can store about 800 Mb of data, and thus, 8,000 different programs can potentially be stored on the CD if each program requires about 100 Kb of data. However, the lead-in area (LIA) is not large enough to store the table of contents information required to access each of the 8,000 programs.

With respect to CD-ROM and CD-I discs, data is recorded and reproduced on such discs by using a data processing unit to reconstruct a 98-frame audio data block into a sector unit. Furthermore, a CD-ROM driver is connected to a host computer (e.g. a personal computer) and reproduces the reconstructed data by using a CD-ROM operating program loaded on the hard disc of the host computer. As a result, in order to use a CD-ROM disc as the recording medium of a karaoke system, the CD-ROM must be compatible with the particular host computer on which the operating program is loaded. As a result of the compatibility requirement, the mass distribution of CD-ROM discs is difficult.

In order to compensate for the drawbacks of CD-ROM disc, a CD-I system incorporates a computer having text, image, voice, and computer data circuits into the compact disc reproducing apparatus. In other words, the CD-I disc is substituted for the hard disc (or floppy disc) of the host computer used to reproduce the CD-ROM disc.

However, in a CD-I system, the data stored on the CD-I disc can only be accessed with a pre-loaded application program. Consequently, the CD-I system requires a particular operating system as well as the application program, and thus, special software is required. Therefore, the data contained in a CD-I disc cannot be accessed directly by the computer but must be accessed via the operating system or the application program.

SUMMARY OF THE INVENTION

In order to solve the above problems, an object of the present invention is to provide a CD video-song accompaniment apparatus which can reproduce thousands of songs and high-quality background images corresponding to the mood of each song from a single compact disc.

In order to achieve the above object, a CD video-song accompaniment apparatus which reproduces information from a compact disc is provided. The apparatus comprises: a CD reproducing portion which reads audio data from said compact disc and generates an audio signal if said compact disc is a first type of compact disc and which reads digital data from said compact disc if said compact disc is a second type of compact disc, wherein said digital data comprises background image data and music information data; a CD-OK reproducing portion which inputs said digital data from said CD-reproducing portion and generates a first background image and a second background image based on said background image data and generates a CD-OK audio signal based on said music information data; an audio selector which inputs said audio signal generated by said CD reproducing portion and said CD-OK audio signal generated by said CD-OK reproducing portion and which selectively outputs either said audio signal or said CD-OK audio signal; and a main controlling means for determining whether said compact disc is said first type of compact disc or said second type of compact disc, wherein said main controlling means instructs said audio selector to output said audio signal if said compact disc is said first type of compact disc and instructs said audio selector to output said CD-OK audio signal if said compact disc is said second type of compact disc.

Also, the CD-OK reproducing apparatus may comprise: a memory portion which stores at least a portion of said music information data and at least a portion of said background image data output from said CD reproducing portion; a sound reproducing portion which inputs said portion of said music information data and generates said CD-OK audio signal based on said portion of said music information data; microphone sound detecting means for detecting sounds input via a microphone; a video reproducing portion which comprises a video memory for storing said portion of said background image data from said memory portion, wherein said video reproducing portion generates said first background image and said second background image based on said portion of said background image data; a control signal portion which generates timing signals to synchronize functions of said CD-OK reproducing portion; CD-OK controlling means for controlling at least one function of at least one of said memory portion, said sound reproducing portion, said microphone sound detecting means, said video reproducing portion, and said control signal portion; an external video input port which inputs an external video signal; and a superimposing means for inputting said external video signal from said external video input port and said first background image from said video reproducing portion and for superimposing said first background image and said external video signal to produce a superimposed signal.

In addition, the control signal portion may comprise: a first sync detector which separates an external composite sync signal from said external video signal when said external video signal is input to said external video input port; a sync signal generator which generates an internal horizontal sync signal and a screen refresh address signal, wherein said internal horizontal sync signal is synchronized with said external composite sync signal when said external composite sync signal is output from said first sync detector and wherein said screen refresh address signal refreshes address locations of said video memory of said video reproducing portion; and a control signal generator which inputs said internal horizontal sync signal from said sync signal generator and said external composite sync signal from said first sync detector and generates a main clock signal based on said external composite sync signal and said internal horizontal sync signal.

Furthermore, the video memory may comprise: a first selector which selectively outputs either a first selection signal or a second selection signal as a chip selection signal in accordance with a first clock signal; a second selector which selectively outputs either a reading address signal or a writing address signal in accordance with said first clock signal; a first image memory and a second image memory which store data in accordance with said writing address signal, said chip selection signal, and a write control signal and which output data in accordance with said reading address signal and said chip selection signal; a first data transmission gate which transfers data from a first data bus to a second bus based on said first clock signal; a second data transmission gate which transfers data from said first data bus to a third data bus based on said first clock signal; a first bi-directional transmission gate which transfers data from said second data bus to said first image memory and transfers data from said first image memory to said second data bus based on said first clock signal; a second bi-directional transmission gate which transfers data from said third data bus to said second image memory and transfers data from said second image memory to said third data bus based on said first clock signal; a first latch which latches data on said second data bus as first latched data and outputs said first latched data to a fourth data bus based on a second clock signal; a second latch which latches data on said third data bus as second latched data and outputs said second latched data to said fourth data bus based on said second clock signal and a third clock signal such that said first latched data and said second latched data are alternatively output to said fourth data bus; and an output transmission gate which outputs data from said fourth data bus as said portion of said background data.

In addition, the superimposing means may comprise: an attenuator which attenuates said external video signal to produce an attenuated video signal; an image signal selector which inputs a video selection control signal from said video memory, said first and second background images from said second mixer, and said attenuated video signal from said attenuator, wherein said image signal selector selectively outputs either said attenuated video signal or said first and second background images as a selected video signal based on said video selection control signal; and an output amplifier for amplifying said selected video signal.

Also, the sound reproducing portion may comprise: a MIDI data transmitter which inputs said portion of said music information data from said memory portion and converts said portion of said music information data into MIDI data; a sound source processor which inputs said MIDI data and generates song accompaniment data based on said MIDI data; and an audio converter which inputs said song accompaniment data and converts said song accompaniment data into said CD-OK audio signal.

Furthermore, the microphone sound detecting means may comprise: input detecting means for inputting said sounds input via said microphone and outputting a high frequency oscillating signal when a level of said sounds is substantially equal to a predetermined threshold level; waveform converting means for inputting said high frequency oscillating signal and generating a rectangular wave signal which has a pulse width which is substantially equal to a pulse width of said high frequency oscillating signal; and a transmission gate which outputs said rectangular wave signal to said CD-OK controlling means in response to a microphone control signal output from said control means.

Also, the CD video-song accompaniment apparatus may further comprise: a display, wherein said music information data comprises lyrics data corresponding to lyrics of a particular song, wherein said video reproducing portion generates a first lyrical text signal corresponding to first lyrics of a first portion of said particular song and generates a second lyrical text signal corresponding to second lyrics of a second portion of said particular song based on said lyrics data, wherein said video reproducing portion outputs said first lyrical text signal along with said first background image and outputs said second lyrical text signal along with said second background image, wherein said CD-OK audio signal represents musical sounds of said particular song and comprises first and second musical sounds respectively corresponding to said first and second portions of said particular song, wherein said sound reproducing portion outputs said first musical sounds when said video reproducing portion outputs said first lyrical text signal and outputs said second musical sounds when said video reproducing portion outputs said second lyrical text signal, wherein said display inputs said first and second lyrical text signals and respectively displays said first and second lyrics in accordance with said first and second lyrical text signals, wherein said video reproducing portion outputs said first lyrical text signal such that a portion of said first lyrics displayed on said display change color to instruct a user of said CD video-song accompaniment apparatus to sing said portion of said first lyrics at a time which coincides with a corresponding portion of said first musical sounds, and wherein said video reproducing portion outputs said second lyrical text signal such that a portion of said second lyrics displayed on said display changes color to instruct said user to sing said portion of said lyrics at a time which coincides with a corresponding portion of said second musical sounds.

In addition, the CD-OK controlling means may comprise: speed determining means for determining a speed at which a first portion of said first lyrics should be sung by said user; sampling means for sampling said sounds input by said microphone sound detecting means when said first portion of said first lyrics changes color; singing determining means for determining if said sounds sampled by said sampling means indicate that said user sang said first portion of said first lyrics when said first portion of said first lyrics changed color; and scoring means for calculating a score representing how well said user sang said particular song based on whether or not said user sang said first portion of said first lyrics when said first portion of said first lyrics changed color.

BRIEF DESCRIPTION OF THE INVENTION

The above objects and advantages of the present invention will become more apparent by describing in detail a preferred embodiment thereof with reference to the attached drawings in which:

FIG. 3 shows a format of a program area (PMA) of a compact disc according to the present invention;

FIG. 4 shows one example of a disc description format recorded in the disc description area of FIG. 3;

FIG. 5 shows one example of a background image index table recorded in the first table area of FIG. 3;

FIG. 6 shows a compression method of the background image information recorded in the first data area of FIG. 3;

FIG. 8 shows one example of a music index table recorded in the second table area of FIG. 3;

FIG. 9 shows a preferred embodiment for classifying the feature information contained in the music information index table of FIG. 8;

DETAILED DESCRIPTION OF THE INVENTION

Figures 1, 2:
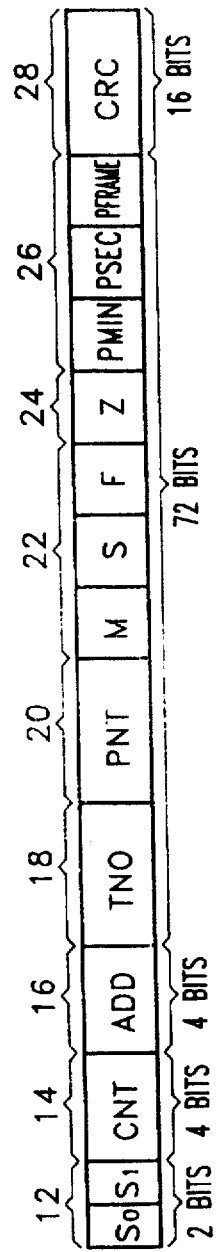
FIG. 1 shows the data configuration of a subcode channel Q of a compact disc.
FIG. 2 shows one example of a table of contents of the subcode channel Q according to the present invention.

The recording medium used in the video-song accompaniment apparatus of the present invention will be referred to as a CD-OK disc. The CD-OK disc generally contains a lead-in area (LIA), a program area (PMA), and a lead-out area (LOA). The lead-in area (LIA) of one embodiment of a CD-OK disc is shown in FIG. 1. As shown in the figure, the lead-in area (LIA) comprises the subcode channel Q from among the eight subcode channels P, Q, R, S, T, U, V, and W and contains 98 channel bits.

In particular, the 98 channel bits comprise two synchronization bits (S0 and S1) 12, four control bits (CNT) 14, four address bits (ADD) 16, a seventy-two bit data area, and a 16-bit CRC code 28. The seventy-two bit data area contains eight bits of a track number code (TNO) 18, eight bits of a pointer (PNT) 20, twenty-four bits of an address (minute (M), second (S), frame (F)) 22, eight interval bits (Z) 24, and twenty-four bits of a pointer address (PMIN, PSEC, PFRAME) 26.

In the lead-in area (LIA), the decimal number "00" represents the track number code (TNO) of the subcode channel Q and the table of contents recorded on the disc. The table of contents includes the pointer 20 and the pointer addresses 26, and the pointer addresses 26 represent the value of the minute (M), second (S), and frame (F) address of the starting point of each track of the program area (PMA) of the CD-OK disc.

FIG. 2 shows an example of a table of contents according to the present invention. As shown in the figure, if the pointer 20 contains the number "01h", the minute PMIN, second PSEC, and frame PFRAME data of the pointer address 26 indicates the starting address of the first track of the program area (PMA). If the pointer 20 contains the number "A0h" the minute data PMIN of the pointer address 26 indicates the first track number of the program area (PMA). If the pointer 20 contains the number "A1h" the minute data PMIN of the pointer address 26 indicates the last track number of the program area (PMA). Finally, if the pointer value is "A2h" the pointer address 26 indicates the starting address of the lead-out area (LOA). In the example described above, the program area (PMA) contains one track of data, and thus, the values of the pointers A0h and A1h listed in the table of contents are the same.

FIG. 3 illustrates an embodiment of the program area (PMA) of the CD-OK. As shown in the figure, the program area (PMA) comprises a disc label area 30, a disc description area 32, a first table area 34, a second table area 36, a first data area 38, and a second data area 40. Furthermore, between the second data area 40 and the lead-out area (LOA), at least one CD-DA track may be included. In such case, an additional pointer and address of the CD-DA track are included in the table of contents in the lead-in area (LIA). Moreover, in this embodiment, the disc label area 30 adopts the ISO 9660 format.

The disc description area 32 is shown in FIG. 4 and comprises two sectors in mode 1 of a CD-ROM format. The sectors contain information for identifying the disc type and a version number of the disc. In addition, the disc description area 32 has an absolute address A (FIG. 3), which represents a predetermined time interval from starting address (i.e. 00 minutes, 00 seconds, and 00 frames) of the program area (PMA).

An example of the first table area 34 is illustrated in FIG. 5. The first table area 34 has a starting address B (FIG. 3) and comprises a background image index table 35 which contains indexing information for background images that are recorded in the first data area 38. The index table 35 contains index numbers 42, starting addresses 44, and feature information 46 for each of the background images stored in the data area 38.

The index number 42 of each background image is represented by two bytes of information which sequentially represents a number from 0000 to 3999. The starting address 44 of each image within the program area (PMA) is represented by three bytes. In particular, the three bytes respectively represent the minute (M), second (S), and frame (F) location of each background image stored in the program area (PMA). The feature information 46 of each background image is represented by one byte of information and indicates the group (e.g. G1, G2, etc.) in which each particular background image is classified. For example, background images having similar images (i.e. mountain images, seascape images, images of people, images of automobiles, images of animals, skyline images, etc.) may be grouped together. If the feature information 46 contains the number "00h", the corresponding background image is the first image of a group of images. Alternatively, if the feature information 46 contains the number "01h", the corresponding background image is a continuing image of the image group.

The space needed on the CD-OK disc to store a background image index table which indexes 4000 still images is roughly twelve sectors if a mode 1 disc format is used. In particular, each listing of the index table contains six bytes of information (i.e. two bytes for the index number 42, three bytes for the starting address 44, and one byte for the feature information 46). Thus, in order to store an index listing for each of the 4,000 still images, 24,000 bytes are required (i.e. 4,000 images×6 bytes/image). Since each sector of the CD-OK disc can store 2048 bytes of information, approximately 12 sectors are required to store the 24,000 bytes (i.e. 24,000 bytes×1 sector/2048 bytes=11.72 sectors≈12 sectors).

The first data area 38 of the program area (PMA) has a starting address D (FIG. 3) and contains the background images indexed in the background index image table 35 stored in the first table area 34. In addition, FIG. 6 illustrates the format in which each background image is stored in the first data area 38. In particular, each background image comprises 360 dots×240 lines of information which is compressed into two-byte pixel data 48 and a series of two-byte run-length data 50. Each two-byte pixel data 48 comprises a one-bit start bit and a 15-bit RGB555 code, and each two-byte run-length data 50 comprises a one-bit continuation bit and a 15-bit run-length code.

Therefore, the RGB555 coding of the background image information requires 84.37 sectors ((360×240×2)/2048). However, the run-length coding of the background image information requires about forty sectors if the background image is a natural image and about five sectors if a background image is a graphics image. Accordingly, in order to record 4,000 natural images, roughly 400 megabytes are required.

Figure 7:
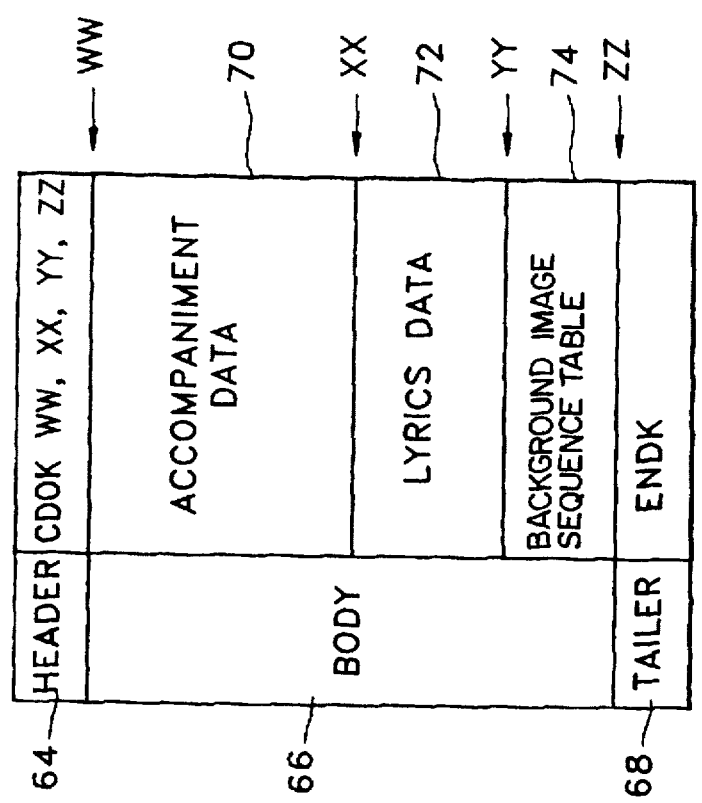
FIG. 7 shows one example of a CD-OK format of the background image information recorded in the first data area of FIG. 3.

FIG. 7 illustrates the format for storing each background image in the first data area 38. As shown in the figure, each background image comprises a header 52, a body 54, and a tailer 56. The header 52 contains data format discrimination information CD-OK, a pointer XX, and a pointer YY. The pointer XX indicates the starting position of body 54, and the pointer YY indicates the starting position of tailer 56. The body 54 contains compressed background image data relating to the actual background image, and the tailer 56 contains information indicating the end of each image.

An example of the second table area 36 is illustrated in FIG. 8. The second table area 36 has a starting address C (FIG. 3) and comprises a music index table 37 which contains indexing information for songs which are recorded in the second data area 40. The music index table 37 contains index numbers 58, starting addresses 60, and feature information 62 for each song.

The index number 58 of each song is represented by two bytes of information which sequentially represents a number from 0000 to 3999. The starting address 60 of each song stored in the program area (PMA) is represented by three bytes. In particular, the three bytes respectively represent the minute (M), second (S), and frame (F) location of each song stored in the program area (PMA). The feature information 62 of each song is represented by one byte of information and indicates the group in which each particular song is classified.

An example of the classification system represented by the feature information 62 is shown in FIG. 9. For instance, if the upper four bits of the byte of feature information 62 relating to a particular song contain the decimal number "0", the song is not a "popular song". On the other hand, the upper four bits of the feature information 62 indicates the rhythm of the particular song if they contain the decimal number "1" to "7".

The lower four bits are also expressed in binary-coded decimal form. If the upper four bits contain the decimal number "0", the lower four bits represent the genre or theme of a particular song if they contain the decimal number "2" to "8". On the other hand, if the upper four bits do not contain the decimal number "0", the lower four digits indicate the time period in which the song was produced.

For example, if the feature information 62 of a particular song contains the binary coded decimal number "12", the particular song is a dance (dance 1) song which was produced between 1970 and 1990. On the other hand, if the feature information 62 contains the binary coded decimal number "06", the particular song is an army song.

The size of the music index table 37 stored in the second table area 36 is similar to the size of background image index table 35 stored in the first table area 34. Therefore, the second table area 36 occupies roughly twelve sectors of a CD-OK disc if a mode 1 format is used.

Figure 10:
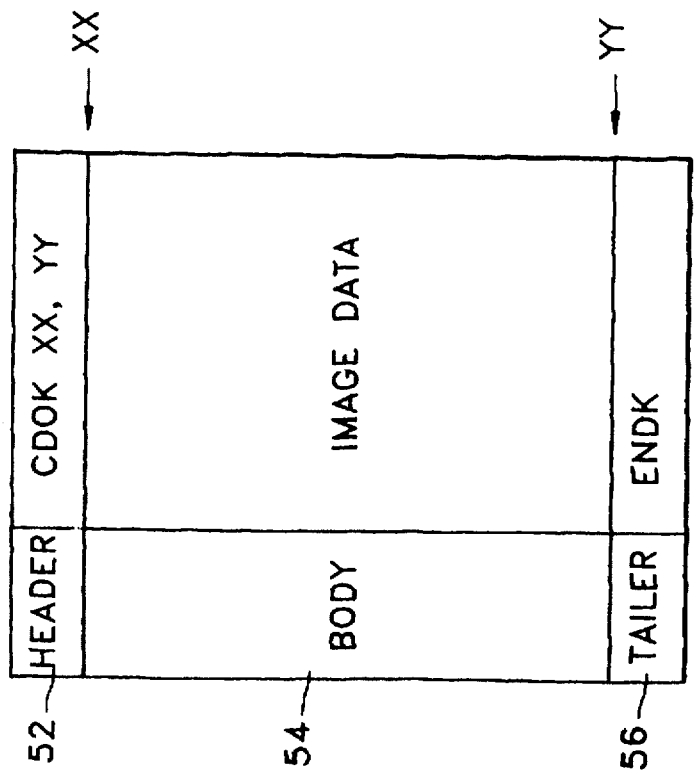
FIG. 10 shows one example of a CD-OK format of the music information recorded in the second data area of FIG. 3.

The second data area 40 of the program area (PMA) has a starting address E (FIG. 3) and stores the music information for the thousands of songs indexed in the music index table 37. The format in which the music information is stored in the second data area 40 is illustrated in FIG. 10. In particular, the music information comprises a header 64, a body 66, and a tailer 68. The body 66 of the musical information contains accompaniment data 70, lyrics data 72, and a background image sequence table 74. The accompaniment data section 70 contains the audio data for the particular song and has a MIDI format, and the lyrics data section 72 contains the lyrics for the particular song. In addition, the background image sequence table 74 contains a predetermined sequence of group information so that particular groups of background images will be displayed in a certain order when the particular song is reproduced. For example, the group information may be edited to produce images suitable for the mood and theme of the corresponding song.

The header 64 contains format discrimination information CD-OK, a pointer WW, a pointer XX, a pointer YY, and a pointer ZZ. The pointer WW indicates the start of body 66 and the accompaniment data section 70. The pointer XX indicates the start of lyrics data section 72. The pointer YY indicates the start of background image sequence table 74. Finally, the pointer ZZ designates the start of tailer 68.

Figure 11:
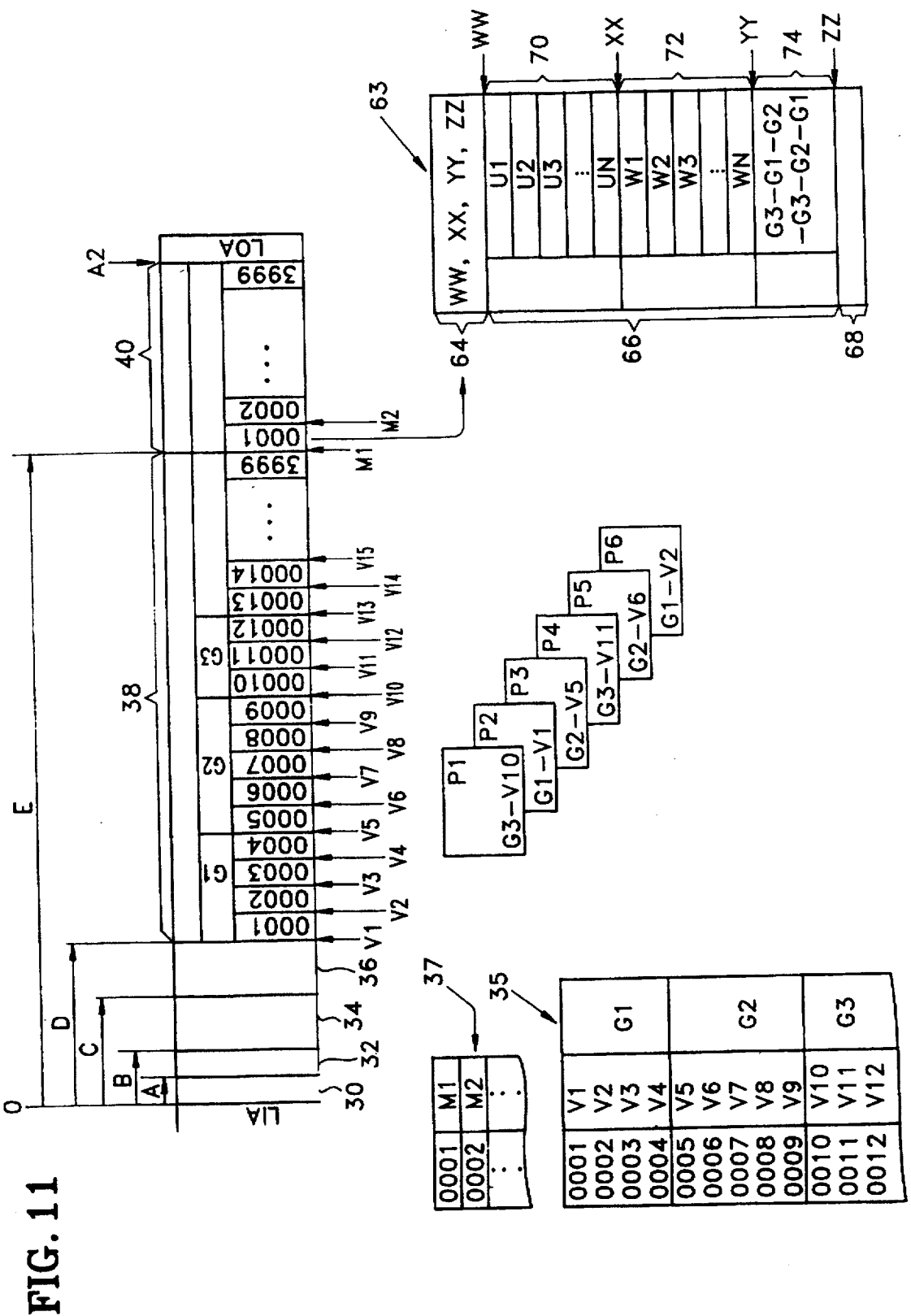
FIG. 11 shows a reproducing method of the CD-OK disc according to the present invention.

An example of how information is read and reproduced from the program area (PMA) of the CD-OK disc having the format described above will be described below with reference to FIG. 11. First, when a CD-OK disc is loaded in the reproducing apparatus, the apparatus locates the starting address of the program area (PMA) by reading the table of contents information from the lead-in area (LIA). Then, apparatus determines the starting address B of the first table area 34 and the starting address C of the second table area 36 based on the starting address of the program area (PMA) and other information contained in the lead-in area (LIA). After the starting addresses have been obtained, the background image index table 35 and the music index table 37 are respectively read from first and second table areas 34 and 36.

After index tables 35 and 37 are read, a user of the karaoke system is able to reproduce a song and other information stored on the CD-OK. For example, if the user inputs a "0001" via an input device, the recording apparatus examines the music index table 37 and reads the address of the music information which corresponds to the index number "0001". As illustrated in FIG. 11, the index number "0001" corresponds to the music information 63 which has a starting address M1. Subsequently, the music information 63 is read from the address M1 of the second data area 40.

Afterwards, the header 64 of the music information 63 is read to obtain the pointer YY which contains the starting position of the background image sequence table 74 that includes group information for the selected music information 63. In this instance, the table 74 contains the group information "G3-G1-G2-G3-G2-G1" and indicates that background images will sequentially be selected from groups G3, G1, G2, G3, G2, and G1 of the background image index table 35. Furthermore, the reproducing apparatus may assign index numbers 42 listed in the background image index table 35 to the groups G3, G1, G2, G3, G2, G1 in the following manner.

First, the first index number "0010" listed in the table 35 and corresponding to group G3 may be selected. Then, the first index number "0001" corresponding to the group G1 may be selected. Afterwards, the first index number "0005" corresponding to the group G2 may be selected. However, when another index number is subsequently selected from the group G3, the second index number "0011" listed in the table 35 which corresponds to the group G3 may be selected since the index number "0010" has already been selected. Afterwards, the index numbers "0006" and "0002" may be sequentially and respectively selected for groups G2 and G1.

As a result, the reproduction apparatus will sequentially display the background images corresponding to the index numbers "0010", "0001", "0005", "0011", "0006", "0002" listed in the background image index table 35. In order to obtain the data for background images which correspond to the selected index numbers 42, the apparatus determines which addresses of the first data area 38 correspond to the selected index numbers 42 in the table 35. In particular, the apparatus obtains the addresses V10, V1, V5, V11, V6, and V2 from the index table 35, and reads the background images P1 to P6 recorded at these addresses from the data area 38.

Furthermore, the apparatus also reads the header 64 of the music information 63 to obtain the pointers WW and XX which respectively contain the starting positions of the song accompaniment data "U1 to Un" 70 and the lyrics data "W1 to Wn" 72 which correspond to the accompaniment data "U1 to Un" 70. Then, the reproducing apparatus sequentially displays the background images P1 to P6 and reproduces the song accompaniment data "U1 to Un" 70. In addition, the apparatus overlays the lyrics data "W1 to Wn" 72 on the background images P1 to P6 in synchronicity with the reproduction of the song accompaniment data "U1 to Un" 70.

Figure 12:
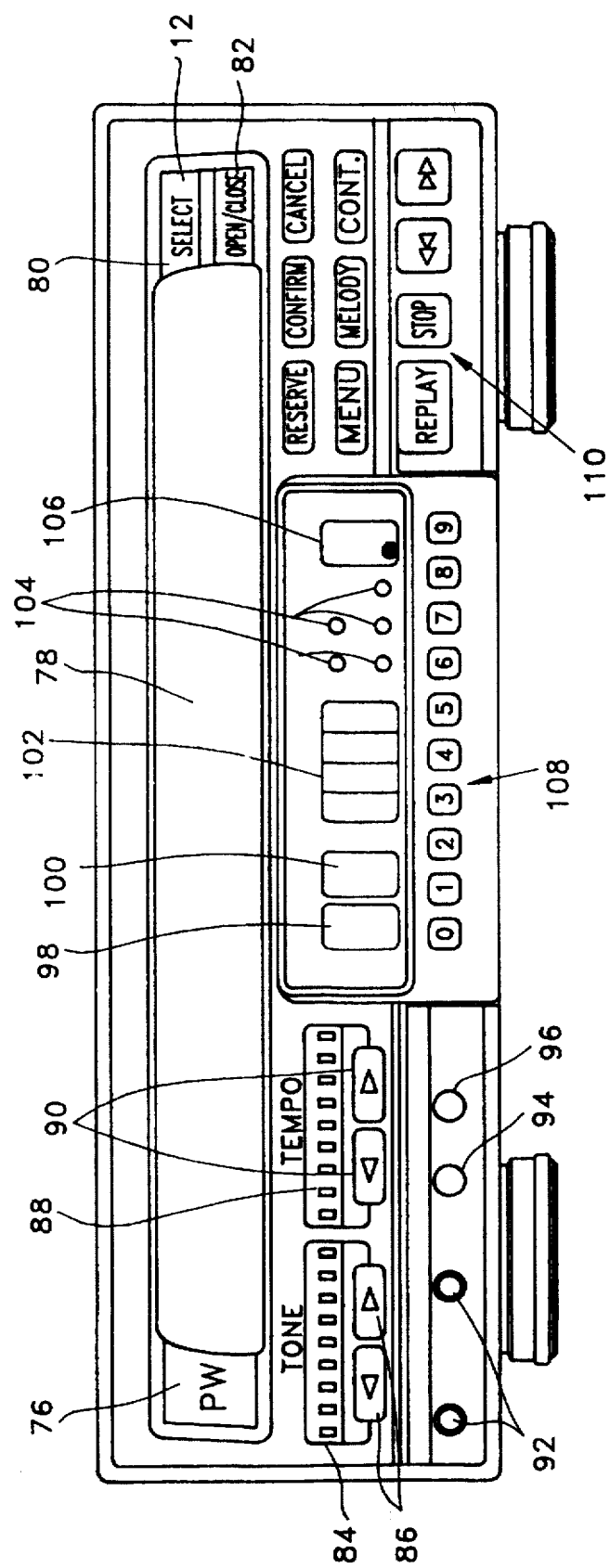
FIG. 12 shows a front panel of the CD-OK reproducing apparatus according to the present invention.

An example of a front panel of the reproduction apparatus is illustrated in FIG. 12. As shown in the figure, the front panel comprises a power switch 76, a disc tray 78, a disc selection switch 80, a tray open/close switch 82, a volume level indicator 84, a volume up/down switch 86, a tempo level indicator 88, a tempo up/down switch 90, microphone input ports 92, a microphone volume adjusting knob 94, a digital echo adjusting knob 96, a selected position display of the disc changer 98, a reserved song number display 100, a selected song number display 102, function indication lamps 104, a remote control receiving window 106, ten numerical keys 108, and ten function keys 110. In addition, the function indication lamps 104 comprise an audio CD indication lamp, a CD-OK indication lamp, a melody indication lamp, a continual reservation indication lamp, and a fanfare setting indication lamp. Also, the ten function keys 110 comprise a reserve key, a confirm key, a cancel key, a menu key, a melody key, a continuation key, a reproduction key, a stop key, a rewind key, and a fast forward key. Furthermore, the reproduction apparatus comprises a rear panel (not shown) which includes video input ports, video output ports, and audio output ports.

Figure 13:
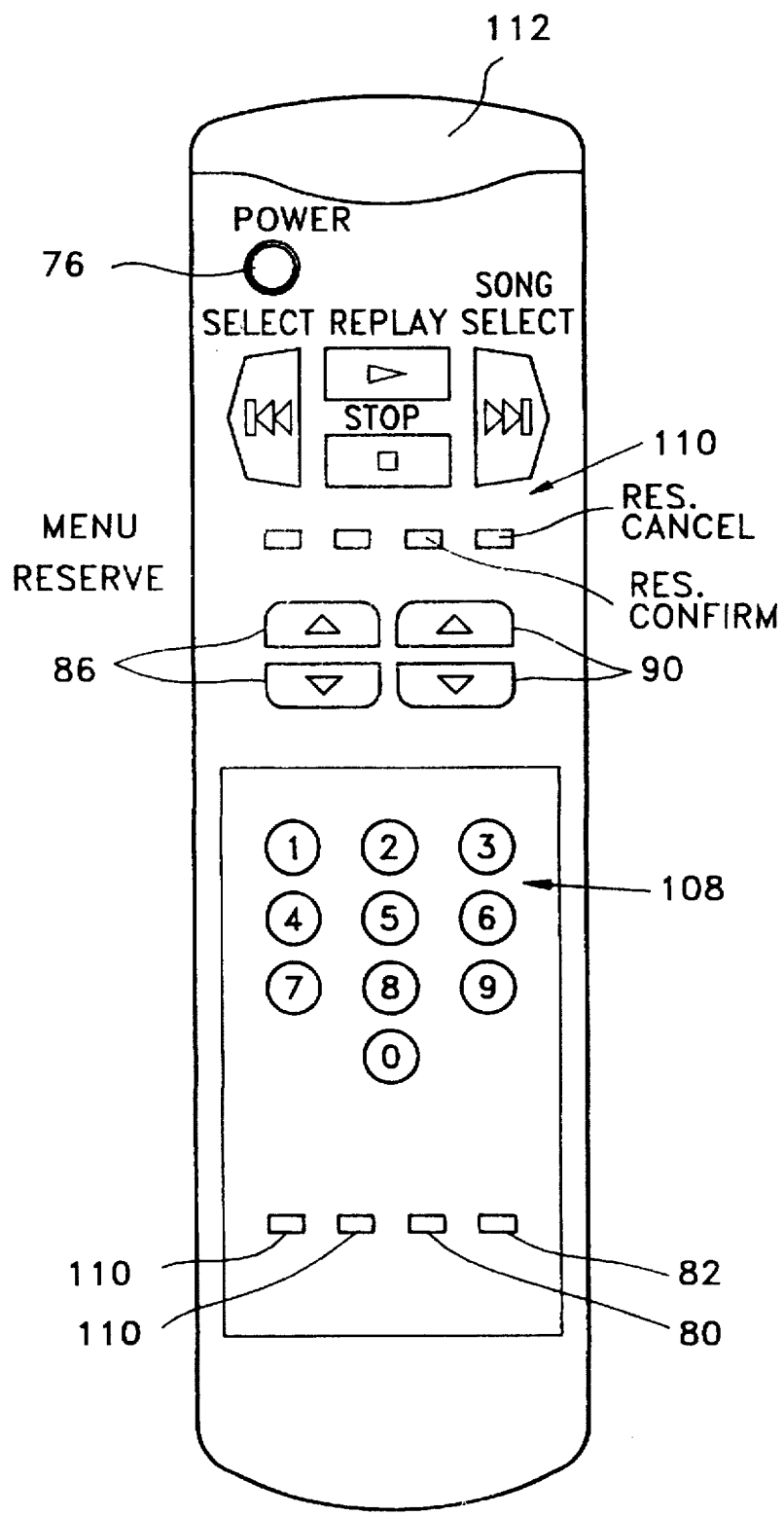
FIG. 13 shows a key array of a remote controller of the CD-OK reproducing apparatus according to the present invention.

An example of a remote controller for controlling the reproduction apparatus illustrated in FIG. 12 is shown in FIG. 13. In particular, the remote controller comprises a remote control sending window 112 and plurality of keys. Furthermore, the plurality of keys of the remote controller which respectively perform the same function as the keys on the control panel of the reproduction apparatus respectively have the same reference designation numbers as keys on the control panel.

Figure 14:
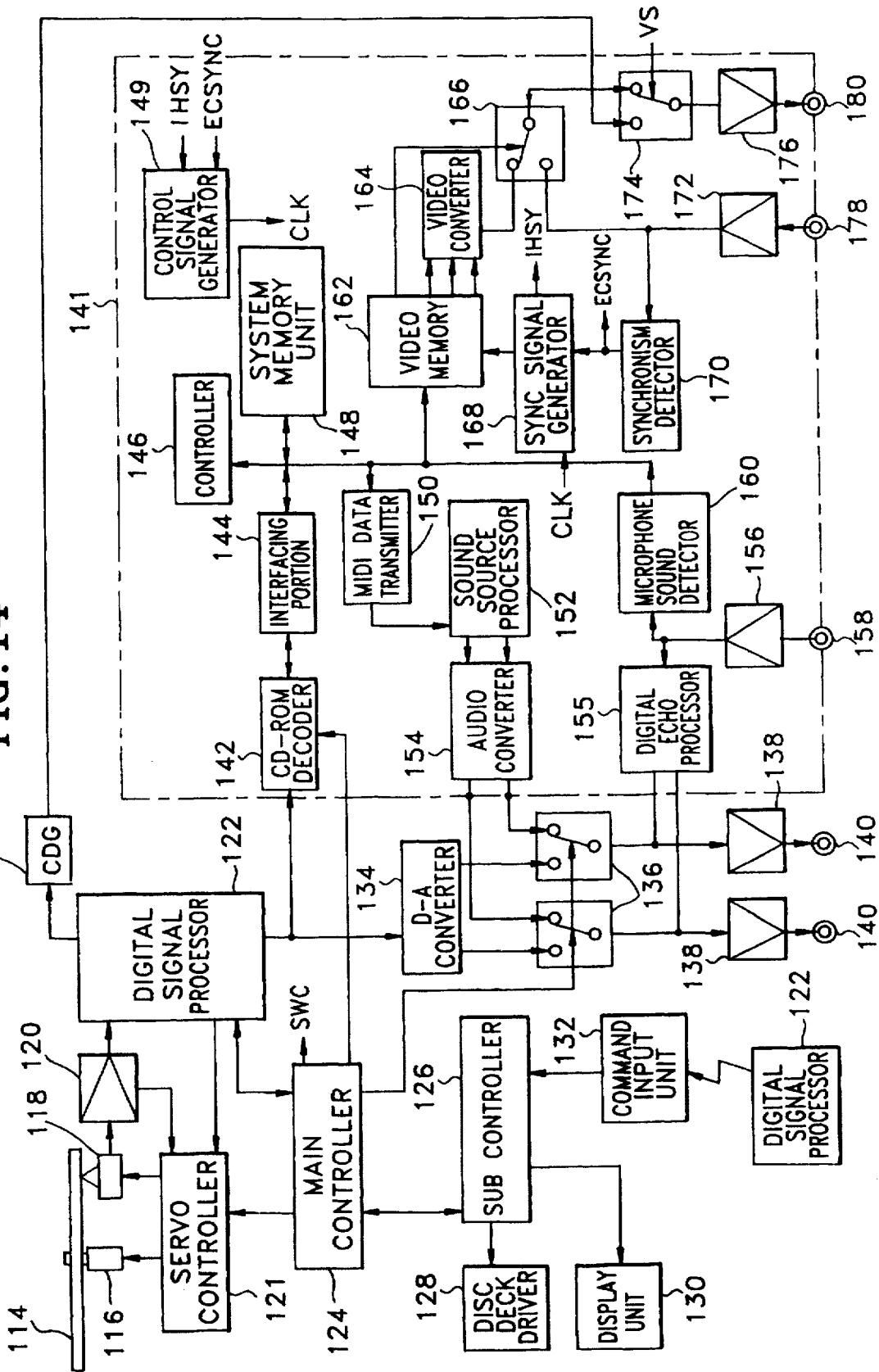
FIG. 14 shows a block diagram of the circuitry of the CD-OK apparatus according to the present invention.

FIG. 14 shows an example of a block diagram of internal circuitry for the reproduction apparatus which can be roughly divided into a CD reproducing portion and a CD-OK reproducing portion 141. Specifically, the CD reproducing portion comprises a spindle motor 116 for a rotating an optical disc 114, an optical pickup 118, an RF amplifier 120, a servo controller 121, a digital signal processor 122, a main controller 124, a sub-controller 126, a disc deck driver 128, a display unit 130, a command input unit 132, a digital to analog (D/A) convertor 134, an audio signal selector 136, audio output amplifiers 138, audio output ports 140, and a compact disc graphics decoder 182.

The CD-OK reproducing portion 141 comprises a CD-ROM decoder 142, an interfacing portion 144, a controller 146, a system memory unit 148, a control signal generator 149, a MIDI data transmitter 150, a sound source processor 152, an audio convertor 154, a digital echo processor 155, an audio input amplifier 156, a microphone sound input port 158, a microphone sound detector 160, a video memory 162, a video convertor (e.g. an encoder) 164, superimposing means 166, a synchronous signal generator 168, a synchronism detector 170, a video input amplifier 172, a video selector 174, a video output amplifier 176, a video input port 178, and a video output port 180.

Based on the configuration above, the audio output ports 140 are capable of outputting audio signals produced from the CD reproducing portion or the CD-OK reproducing portion 141, and the video output port 180 is capable of outputting video signals from the CD reproducing portion or the CD-OK reproducing portion 141. Specifically, the audio selector 136 selectively inputs audio signals from the D/A convertor 134 and the audio convertor 154 and outputs the selected audio signals via the output ports 140. Consequently, the main controller 124 can control from which of the two reproducing portions the audio signals are output by outputting the appropriate control signals to the audio selector 136. Also, the video selector 174 selectively inputs video signals from the compact disc graphics generator 182 or the superimposing means 166 and outputs the selected video signals via the output port 180. Consequently, the main controller 124 can control from which of the two reproducing portions video signals are output by outputting a video selection control signal VS to the video selector 174.

Figure 15:
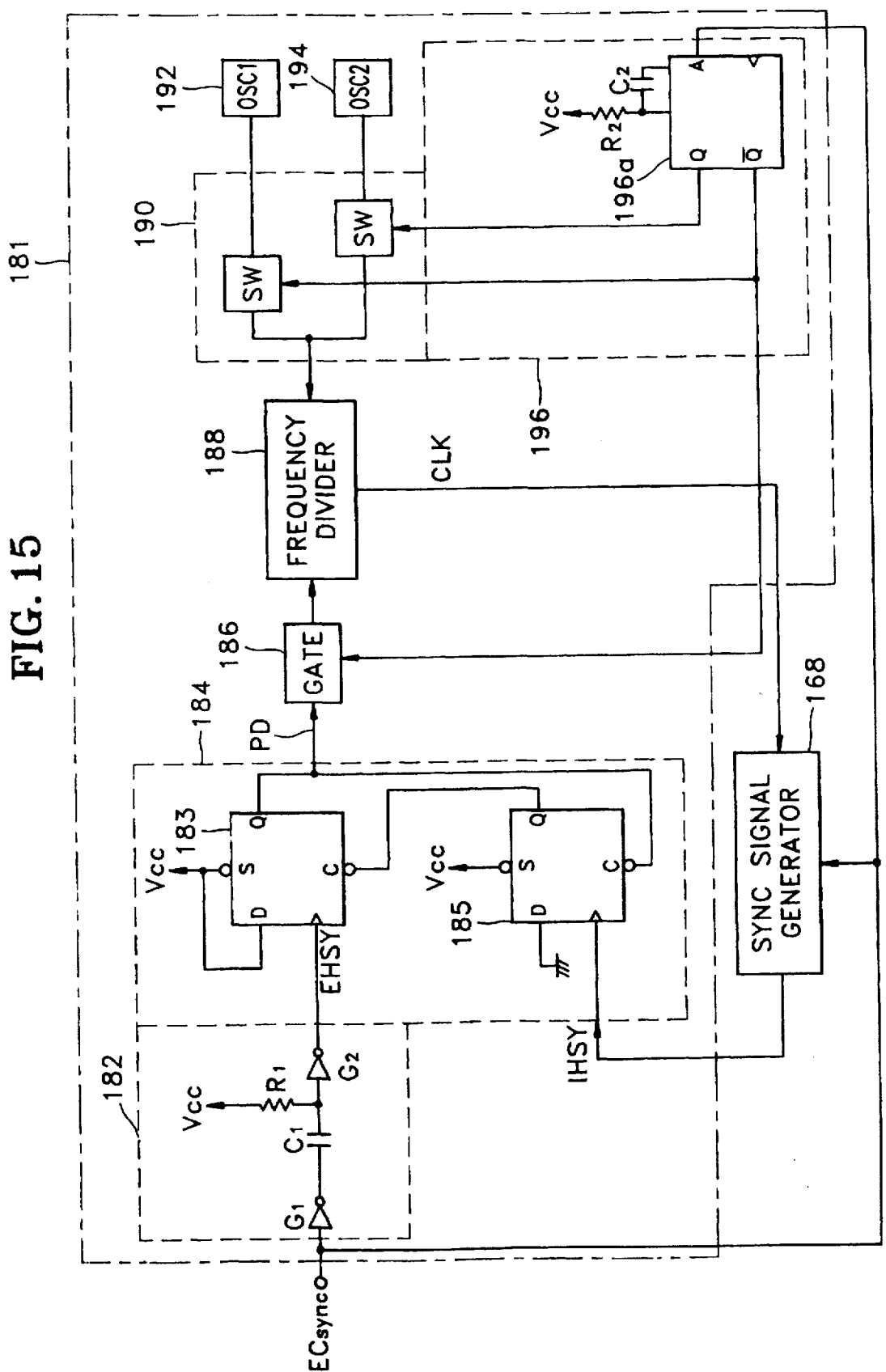
FIG. 15 is a block diagram of the sync signal generator and a clock signal generator of the control signal generator shown in FIG. 14.

The control signal generator 149 shown in FIG. 14 is illustrated in more detail in FIG. 15. As shown in the figure, the generator 149 comprises a clock signal generator 181 which includes a horizontal sync separator 182, a phase difference detector 184, gate means 196, a frequency divider 188, a signal selector 190, a first oscillator 192, a second oscillator 194, and a sync detector 196.

The horizontal sync separator 182 comprises inverters G1 and G2 and a one shot circuit which includes a capacitor C1 and a resistor R1. The inverter G1 inputs an external composite sync signal ECsync generated by the synchronism detector 170 and supplies the signal ECsync to the one shot circuit C1 and R1. Subsequently, the one shot circuit C1 and R1 removes the vertical sync signal from the composite sync signal ECsync to produce an external horizontal sync signal EHSY, and the signal EHSY is output to the phase difference detector 184 via the inverter G2.

The phase difference detector 184 comprises a first flip-flop 183 and a second flip-flop 185. The first flip-flop 183 has a data input port D and a set port S which are connected to Vcc and a clear port C which is connected to the data output port Q of the second flip-flop 185. Furthermore, flip-flop 183 contains a clock port which inputs the external horizontal sync signal EHSY from the horizontal sync separator 182 and a data output port Q which outputs a phase difference detection signal PD. The second flip-flop 185 includes a set port S which is connected to Vcc, a data input port D which is connected to ground, and a clear port C which inputs the detection signal PD output from the first flip-flop 183. Also, a clock port of the flip-flop 185 inputs an internal horizontal sync signal IHSY generated by the sync signal generator 168.

The synchronization detector 196 comprises a monostable multi-vibrator 196a which inputs the composite sync signal ECsync via a trigger input A and outputs switching control signals Q and Q\ via data outputs Q and Q\. In addition, the timing of the multi-vibrator 196a is determined by the RC time constant of a resistor R2 and a capacitor C2. Based on the configuration above, when the external composite sync signal ECsync is high, the switching control signal Q is high, and the switching control signal Q\ is low. On the other hand, if the sync signal ECsync is low, the switching control signal Q is high signal for a duration which is determined by the above RC time constant, and the switching control signal Q\ is high.

The signal selector 190 respectively inputs first and second oscillating signals generated by the first and second oscillators 192 and 194 and outputs one of the oscillating signals based on the control switching signals Q and Q\ output from the synchronization detector 196. In particular, if the switching control signal Q is high, the signal selector 190 outputs the first oscillating signal (e.g. 58.5 MHz) generated by the first oscillator 192. However, if the switching control signal Q\ is high, the signal selector 190 outputs the second oscillating signal (e.g. a 57.252 MHz) generated by the second oscillator 194. Furthermore, the first oscillation signal may be a reference oscillation signal which has a frequency that is synchronized with an image signal reproduced from a laser disc, and the second oscillation signal may be a standard oscillation signal which is synchronized with an NTSC image signal. Based on the configuration above, if external composite sync signal ECsync output from the synchronism detector 170 is high, the signal selector 190 outputs the first oscillation signal. On the other hand, if the sync signal ECsync is low, the selector 190 outputs the second oscillation signal.

The gate means 186 inputs the phase difference detection signal PD from the phase difference detector 184 and outputs the signal PD based on the value of the switching control signal Q\. Specifically, the gate means outputs the signal PD when the signal Q\ is low.

The frequency divider 188 inputs the selected oscillation signal output from the signal selector 190, inputs the signal from the gate means 186, and outputs a frequency divided clock signal CLK based on the frequency of the selected oscillation signal. For example, when the external composite sync synchronization signal ECsync is low and internal synchronization is realized, the second oscillating signal (57.252 MHz) is input. Thus, the frequency divided clock signal CLK is generated in accordance with the second oscillating signal. On the other hand, when the sync signal ECsync is high and external synchronization is realized, the first oscillating signal of (58.5 MHz) is input and phase-locked to the external horizontal sync signal EHSY. Therefore, the frequency divided clock signal CLK is generated based on the phase-locked first oscillating signal. In other words, when external synchronization is realized, the frequency dividing operation performed by the frequency divider 188 is reset by the phase difference detection signal PD. Accordingly, since the detection signal PD represents the phase difference between the external horizontal sync signal EHSY and the internal horizontal sync signal IHSY, the clock signal CLK is synchronized with the external horizontal sync signal ECSY.

The sync signal generator 168 inputs the frequency divided clock signal CLK and the external composite sync signal ECsync and outputs the internal horizontal sync signal IHSY based on such signals CLK and ECsync. As mentioned above, the internal horizontal sync signal IHSY is output to the phase difference detector 184 to form a phase-locked loop. As a result, the clock signal CLK output from the frequency divider 188 is phase-locked with the external composite sync signal ECsync when external synchronization is realized.

Figure 16:
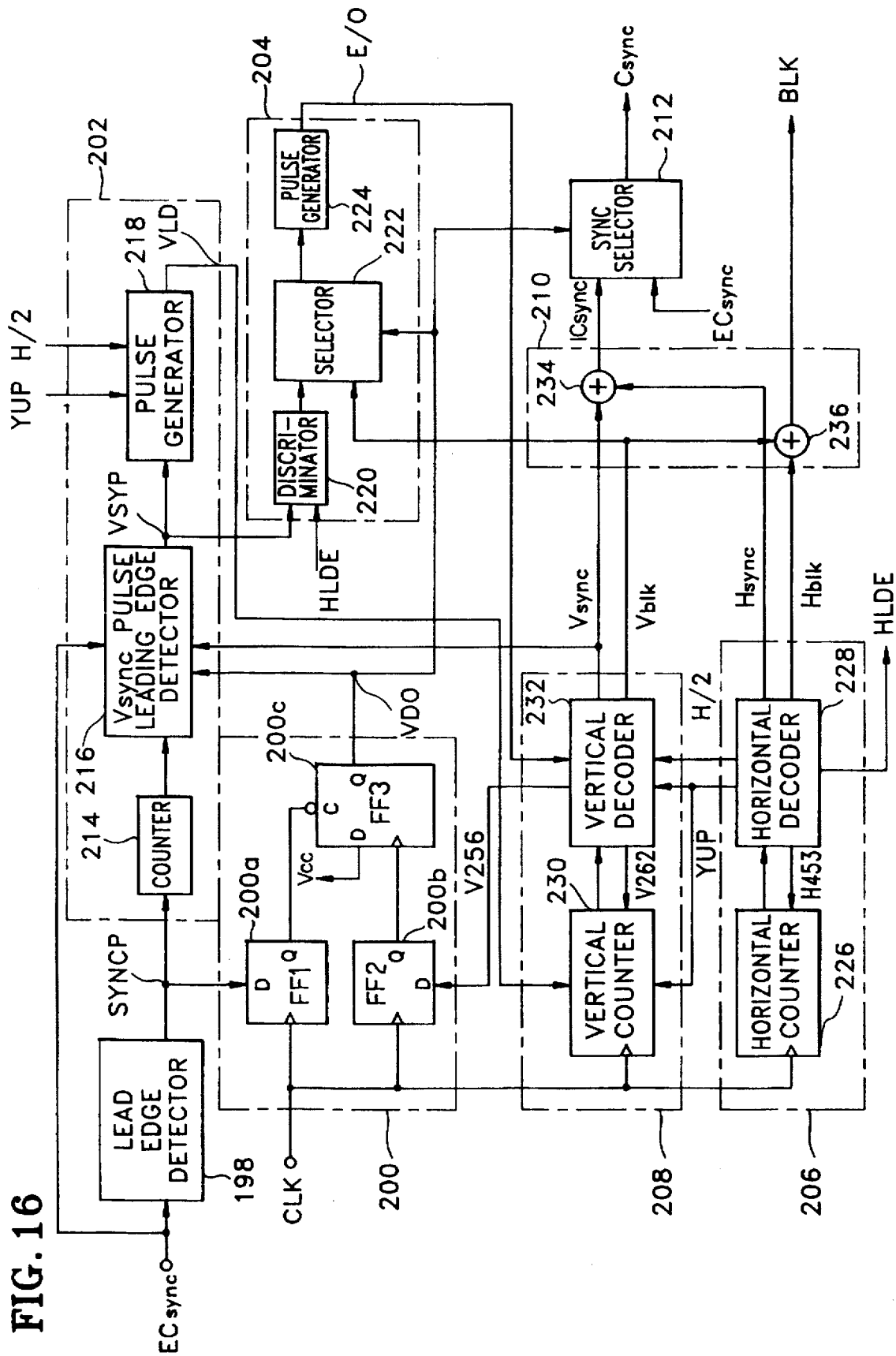
FIG. 16 is a block diagram of the sync signal generator shown in FIG. 14 and FIG. 15.

FIG. 16 shows a more detailed example of the circuitry of the sync signal generator 168. As illustrated in the figure, the sync signal generator 168 comprises a leading edge detector 198, an external sync input detector 200, an external vertical sync leading edge detector 202, a field distinguisher 204, a horizontal sync generator 206, a vertical sync generator 208, a signal combiner 210, and a sync selector 212.

Figure 17:
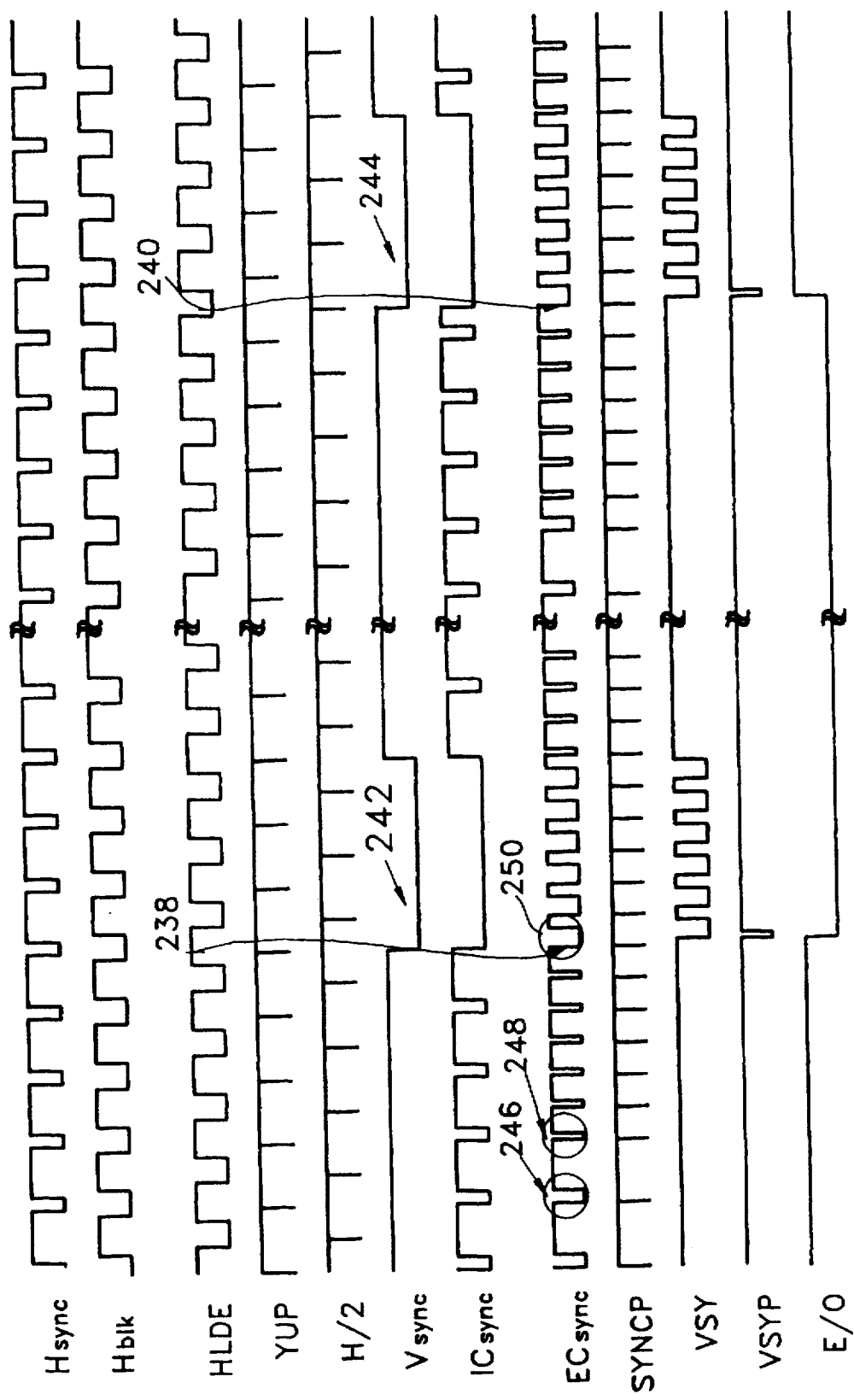
FIG. 17 is a waveform diagram of the signals utilized by the devices shown in FIG. 16.

The leading edge detector 198 receives the external composite sync signal ECsync from the synchronism detector 170 (FIG. 14) and generates a pulse leading edge detection signal SYNCP which corresponds to the leading edge of each pulse of the sync signal ECsync. Examples of the waveforms of the sync signal ECsync and the edge detection signal SYNCP are shown in FIG. 17.

The external sync input detector 200 inputs the pulse leading edge detection signal SYNCP and the frequency divided clock signal CLK output from the control signal generator 149 and comprises flip-flops 200a to 200c. The flip-flop 200a inputs the clock signal CLK via a clock port and the edge detection signal SYNCP via a data input port D and synchronizes the signal SYNCP with the clock signal CLK to produce a first synchronized signal. The flip-flop 200b inputs the clock signal CLK via a clock port and an internal synchronizing restoring signal V256 via a data input port D and synchronizes the restoring signal V256 with the clock signal CLK to produce a second synchronized signal. The flip-flop 200c inputs the first synchronized signal via a clear port C, the second synchronized signal via a clock port, and Vcc via a data input port D. As a result of the inputs above, the flip-flop 200c outputs an external sync input detecting signal VDO.

Based on the configuration above, the flip-flop 200c outputs a high signal as the detecting signal VDO in synchronicity with the output of the flip-flop 200b when the output of the flip-flop 200a is high. Consequently, if the pulse leading edge detection signal SYNCP does not indicate that a leading edge of the external composite sync signal ECsync has been detected, the output of the flip-flop 200a is high and does not clear the flip-flop 200c. As a result, when output of the flip-flop 200b switches from the low to high, the flip-flop 200c outputs a high signal as the external sync input detection signal VDO.

On the other hand, if the detection signal SYNCP indicates that a leading edge of the external composite sync signal ECsync has been detected and becomes low, the flip-flop 200a outputs a low signal. As a result, the flip-flop 200c is cleared and outputs a low signal as the external sync input signal VDO regardless of the output of the flip-flop 200b. Therefore, the detection signal VDO is low if leading edge of the sync signal ECsync is detected and is high when the leading edge is not detected.

The external vertical sync leading edge detector 202 comprises a counter 214, a vertical sync pulse leading edge detector 216, and a pulse generator 218. The counter 214 is reset by the pulse leading edge detection signal SYNCP output from the leading edge detector 198 and counts the pulses of the frequency divided clock signal CLK.

The vertical sync pulse leading edge detector 216 detects the leading edge of an external vertical sync signal VSY and outputs a leading edge detection signal VSYP when such leading edge is detected. Specifically, the leading edge detector 216 inputs the counted value of the counter 214 and determines the pulse width of each pulse of the external composite sync signal ECsync based on the counted value. In particular, when the leading edge of the external composite sync signal ECsync is detected, the detection signal SYNCP resets the counter 214, and the counter 214 begins counting the pulses of the frequency divided clock signal CLK. Consequently, the leading edge detector 216 is able to determine the pulse width of the sync signal ECsync by determining the number of pulses of the clock signal CLK that the counter 214 has counted before being subsequently reset again by the signal SYNCP. If the pulse width of the external composite sync signal ECsync has a value not greater than a first value x1 (2.3 μs≦x1≦4.8 μs), the vertical sync pulse leading edge detector 216 determines that the pulse of the sync signal ECsync is an equalizing pulse 248 (FIG. 17). If the pulse width of the sync signal ECsync has a value between the first value x1 and a second value x2 (4.8 μs≦x2≦27μs), the edge detector 216 determines that the pulse of the sync signal ECsync is a pulse of a horizontal sync signal 246 (FIG. 17). Finally, if the pulse width of the sync signal ECsync has a value which is not less than the second value x2, the edge detector 216 determines that the pulse of the sync signal ECsync is a pulse of a vertical sync signal 250 (FIG. 17). The vertical sync pulse leading edge detector 216 makes the above determinations by recognizing that the pulse width of the horizontal sync signal 246 is 4.8 μs, the pulse width of the equalizing pulse 248 is 2.3 μs, and the pulse width of the vertical sync signal 250 is 27 μs. Accordingly, the first value x1 is set to a value between 2.3 μs and 4.8 μs, and the second value x2 is set to a value between 4.8 μs and 27 μs.

After determining the pulse width of the sync signal ECsync, the edge detector 216 extracts the pulses of the external vertical sync signal VSY (FIG. 17) from the external composite sync signal ECsync. Furthermore, the detector 216 inputs the internal vertical sync signal Vsync (FIG. 17) and synchronizes the leading edge of the first pulse of the external vertical sync signal VSY with the internal vertical sync signal Vsync. Moreover, the detector 216 outputs the leading edge detection signal VSYP in accordance with the leading edge of the first pulse of the external vertical sync signal VSY.

The pulse generator 218 inputs the detection signal VSYP, a horizontal leading edge signal YUP (FIG. 17), and a shifted horizontal leading edge signal H/2 (FIG. 17) which is shifted with respect to the leading edge signal YUP by 180°. Based on the above signals the pulse generator 218 generates a vertical initial value loading signal VLD.

The field distinguisher 204 comprises a discriminator 220, a selector 222, and a pulse generator 224. The discriminator 220 inputs the leading edge detection signal VSYP and an internal reference signal HLDE (FIG. 17) and discriminates between odd and even fields based on the leading edge detection signal VSYP and the internal reference signal HLDE. Specifically, the reference signal HLDE has a predetermined period and is low during the mid point of a horizontal period. Therefore, during an odd field, the edge detection signal VSYP and the vertical sync signal Vsync become low during a high pulse 238 (FIG. 17) of the internal reference signal HLDE. On the other hand, during an even field, the edge detection signal VSYP becomes low during the a low pulse 240 (FIG. 17) of the internal reference signal HLDE. After determining the whether the field is even or odd, the discriminator 220 outputs a corresponding odd/even signal.

The selector 222 inputs the odd/even signal from the discriminator 220 and a vertical blanking signal Vblk and selectively outputs either the odd/even signal or the signal Vblk based on the external sync input detection signal VDO. In particular, if the detection signal VDO indicates that the external composite sync signal ECsync has been detected, the selector 222 outputs the odd/even signal. On the other hand, if the detection signal VDO indicates that the sync signal ECsync has not been detected, the selector 222 outputs the vertical blanking signal Vblk.

The pulse generator 224 inputs the selected signal output from the selector and generates a field distinction signal E/O (FIG. 17) by synchronizing the selected signal with the frequency divided clock signal CLK. As shown in FIG. 17, the field distinction signal E/O remains low during an odd field and remains high during an even field.

The horizontal sync generator 206 comprises a horizontal counter 226 and a horizontal decoder 228. The horizontal counter 226 loads an initial value of 376 corresponding to the leading edge of the horizontal sync signal Hsync and sequentially increments the initial value upon each pulse of the frequency divided clock signal CLK to generate 9-bit counted values. The horizontal decoder 228 inputs the 9-bit counted values and generates the horizontal sync signal Hsync, the horizontal blanking signal Hblk, the horizontal leading edge signal YUP, the shifted horizontal leading edge signal H/2, and the internal reference signal HLDE (FIG. 17). After the 9-bit counted values equal 453, the horizontal decoder 228 outputs a reset signal H453 to reset the horizontal counter 226. As a result, the horizontal counter 226 repeatedly counts from 0 to 453.

The vertical sync generating portion 208 comprises a vertical counter 230 and a vertical decoder 232. The vertical counter 230 loads an initial value of 244 in response to the vertical initial value loading signal VLD from the external vertical sync leading edge detector 202. Afterwards, the counter 230 sequentially increments the initial value upon each pulse of the horizontal leading edge signal YUP to produce counted values. The vertical decoder 232 inputs the counted values, the field distinction signal E/O, the horizontal leading edge signal YUP, and the shifted horizontal leading edge signal H/2. Based on such signals, the decoder 232 generates the vertical sync signal Vsync 242 (FIG. 17) in synchronicity with the horizontal leading edge signal YUP during an odd field and generates the vertical sync signal Vsync 244 (FIG. 17) in synchronicity with the shifted horizontal leading edge signal H/2 during an even field. Furthermore, the vertical decoder generates the vertical blanking signal Vblk in accordance with the counted values in response to the field distinction signal E/O. After the counted values equal 262, the vertical decoder 232 outputs a reset signal V262 to reset the vertical counter 230. As a result, the vertical counter 230 repeatedly counts from 0 to 262.

The signal combiner 210 comprises a first signal combiner 234 and a second signal combiner 236. The first signal combiner 234 combines the internal vertical sync signal Vsync and the internal horizontal sync signal Hsync to generate an internal composite sync signal ICsync. The second signal combiner 236 combines the vertical blanking signal Vblk and the horizontal blanking signal Hblk to generate a blanking signal BLK.

The sync selector 212 inputs the internal composite sync signal ICsync and the external composite sync signal ECsync and selectively outputs one of the sync signals ICsync and ECsync as a composite sync signal Csync in accordance with the external sync input detection signal VDO. In particular, if the detection signal VDO indicates that the external composite sync signal ECsync has been detected, the sync selector 212 outputs the sync signal ECsync as the sync signal Csync. On the other hand, if the detection signal VDO indicates that the sync signal ECsync has not been detected, the selector 212 outputs the sync signal ICsynC as the sync signal Csync.

Figure 18:
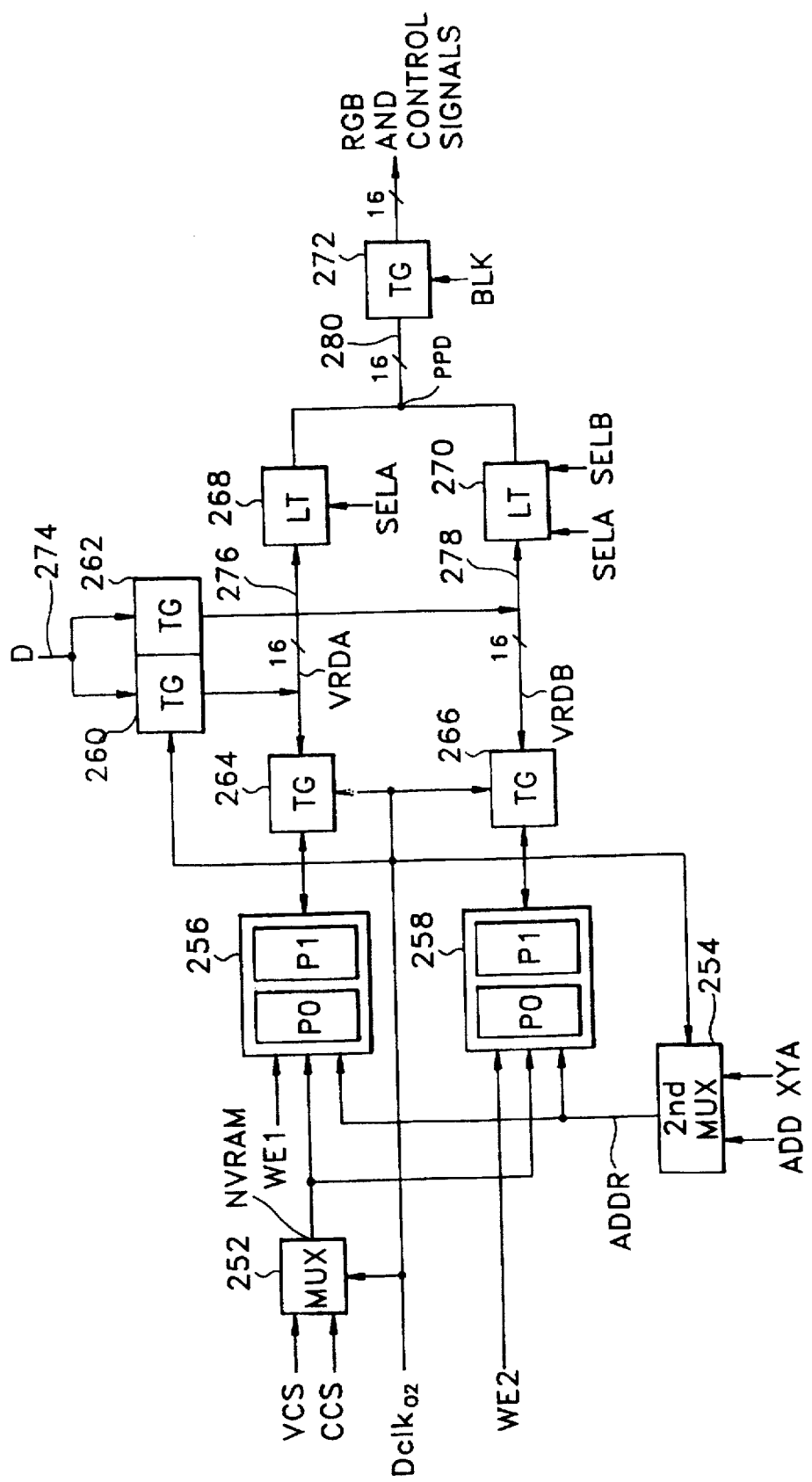
FIG. 18 is a block diagram of the video memory shown in FIG. 14.

FIG. 18 shows the circuitry of the video memory 162 (FIG. 14) in greater detail. As illustrated in the figure, the video memory 162 comprises a first selector 252, a second selector 254, first and second image memories 256 and 258, first and second electrical transmission gates 260 and 262, first and second two-way electrical transmission gates 264 and 266, first and second latch means 268 and 270, and an output electrical transmission gate 272.

The first selector 252 inputs a first selection signal VCS (FIG. 19) and a second selection signal CCS (FIG. 19) and generates a chip selection signal NVRAM (FIG. 19) by alternatively multiplexing the first and second selection signals VCS and CCS. In particular, the first selector 252 inputs a first clock signal $Dclk_{O2}$ (FIG. 19) and selectively outputs either the first or second selection signals VCS and CCS based on the first clock signal $Dclk_{O2}$. The first selection signal VCS is a chip selection signal that is generated by hardware at regular intervals and is used to read data from the first and second image memories 256 and 258 for displaying images on a display. The second selection signal CCS is a chip selection signal that is generated via software at irregular intervals and is used to write data to the first and second data memories 256 and 258.

The second selector 254 inputs a reading address signal XYA and a writing address signal ADD and generates an address signal ADDR (FIG. 19) by alternatively multiplexing the reading and writing address signals XYA and ADD. Specifically, the second selector 254 inputs the first clock signal $Dclk_{O2}$ and selectively outputs either the reading or writing address signal XYA or ADD based on the first clock signal $Dclk_{O2}$. The reading address signal XYA is generated via hardware and is used to read image data from the memories 256 and 258 in order to display images on the display in response to the first clock signal $Dclk_2$. The writing address signal ADD is generated via software and is used to write data to the image memories 256 and 258. The reading address signal XYA actually contains three address signals. Specifically, the reading address signal XYA contains a lower (dot) address signal X, an upper (line) address signal Y, and an uppermost address signal A for selecting a page P0 or P1 of the image memories 256 and 258.

Based on the configuration above, data is written to and read from the first and second image memories 256 and 258 in the following manner. When data is written, the second chip selection signal CCS and the address signal ADDR (i.e. the writing address signal ADD) are simultaneously supplied to both of the image memories 256 and 258. Subsequently, either a writing control signal WE1 is supplied to the memory 256, or a writing control signal WE2 is supplied to the memory 258. If the writing control signal WE1 is supplied, data can be written to the memory 256. On the other hand, if the writing control signal WE2 is supplied, data can be written to the memory 258.

When data is read, the first chip selection signal VCS and the address signal (i.e. the reading address signal XYA) are simultaneously supplied to both of the image memories 256 and 258. The page P0 or P1 of the memories 256 and 258 which corresponds to the uppermost reading address signal A of the reading address signal XYA is designated as a selected page. As a result, the lower and upper address signals X and Y of the reading address signal XYA is used to read data from the corresponding locations of the selected page P0 or P1.

As indicated above, each image memory 256 and 258 comprises a page P0 and page P1 for respectively storing image data relating to a first field and a second field. Furthermore, 16-bit image data WO (FIG. 19) may be written to the pages P0 and P1 of the image memories 256 and 258 as follows. One of the image memories 256 or 258 is selected by outputting one of the write control signals WE1 or WE2. As a result, 16-bit image data WO may be stored in the pages P0 and P1 of the selected memory 256 or 258 by outputting the appropriate writing address signal ADD from the second selector 254. On the other hand, 16-bit image data RO (FIG. 19) may be simultaneously read from the same page P0 or P1 of each of the image memories 256 and 258 by outputting the appropriate reading address signal XYA from the second selector 254.

The first data transmission gate 260 is one-way transmission gate and transfers data D from a first data bus 274 to a second data bus 276. Similarly, the second data transmission gate 262 is one-way transmission gate and transfers data D from the first data bus 274 to a third data bus 278. Moreover, the transmission gates 260 and 262 respectively transfer the data D from the first data bus 274 to the second and third data buses 276 and 278 in accordance with the first clock signal $Dclk_{O2}$.

Figure 19:
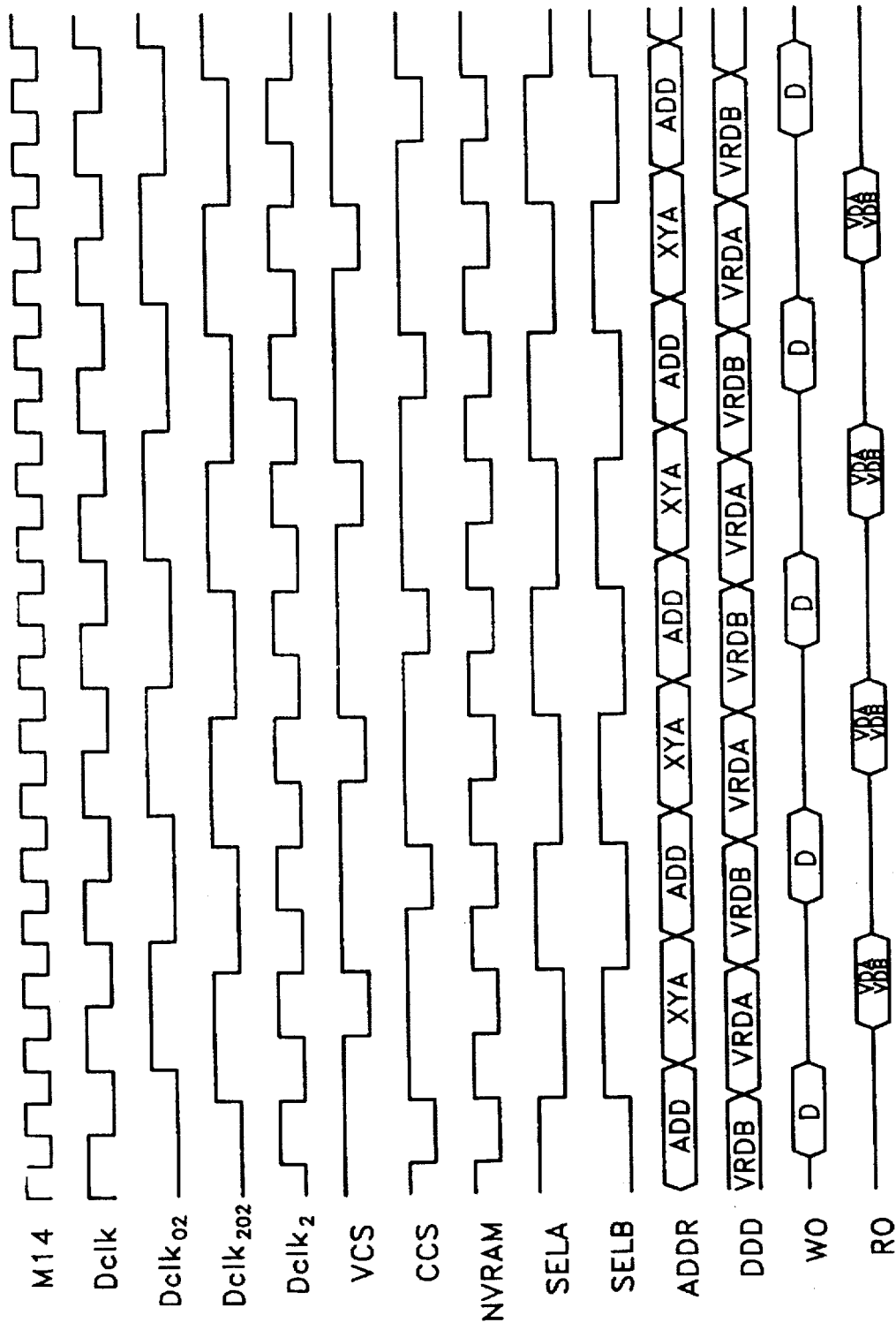
FIG. 19 is a waveform diagram of the signals utilized by the devices shown in FIG. 18.

The first two-way transmission gate 264 transmits data VRDA from the second data bus 276 to the first image memory 256 as data DDD (FIG. 19). Similarly, the second two-way transmission gate 266 transmits data VRDB from the third data bus 278 to the second image memory 258 as the data DDD. In addition, the transmission gates 264 and 266 respectively transfer the data VRDA and VRDB from the second and third data buses 276 and 278 to the first and second image memories 256 and 258 in accordance with the first clock signal $Dclk_{O2}$.

The first latching means 268 latches the data VRDA from the second data bus 276 at the rising edge of a second clock signal SELA (FIG. 19) and outputs the latched data to a fourth data bus 280 at the falling edge of the second clock signal SELA. In addition, the second latching means 270 latches the data VRDB from the third data bus 278 at the rising edge of the second clock signal SELA and outputs the latched data to the fourth data bus 280 at the falling edge of a third clock signal SELB. As a result, the data VRDA and VRDB are alternately output from the data buses 276 and 278 to fourth data bus 280 via the first and second latching means 268 and 270.

The output transmission gate 272 is a one-way transmission gate which outputs data PPD from the fourth data bus 280 as an RGB signal and a control signal. Furthermore, the transmission gate 272 outputs the data PPD in accordance with the blanking signal BLK output from the signal combiner 210 of the sync signal generator 168 (FIG. 16).

As illustrated in FIG. 19, the first clock signal $Dclk_{O2}$ is obtained by frequency-dividing a clock signal Dclk, and the clock signal Dclk is obtained by frequency-dividing a reference clock signal M14. In present embodiment, the frequencies of the clock signals $Dclk_{O2}$, Dclk, and M14 may respectively equal 3.58 Mhz, 7.16 MHz, and 14.32 MHz. In addition, FIG. 19 illustrates a waveform of a clock signal $Dclk_{2O2}$ which leads the first clock signal $Dclk_{O2}$ by 45° and shows a waveform of a clock signal $Dclk_2$ which lags the clock signal Dclk by 45°.

The various control signals utilized by the video memory 162 are derived from the above clock signals as follows. First, the first selection signal VCS is produced by logically multiplying the clock signal $Dclk_2$ and the clock signal $Dclk_{2O2}$ when the clock signals $Dclk_2$ and $Dclk_{2O2}$ are high. The second selection signal CCS is obtained by logically multiplying the clock signal $Dclk_2$ and the clock signal $Dclk_{2O2}$ when the clock signal $Dclk_2$ is high and the clock signal $Dclk_{2O2}$ is low. However, as mentioned above, the first selection signal VCS is continuously generated at regular intervals, and the second selection signal CCS is generated at irregular intervals via software. Based on the timing of the selection signals VCS and CCS, the writing and reading operation of the video memory 162 each operate at 3.58 MHz. In addition, the second clock signal SELA is generated by shifting the phase of the clock signal $Dclk_{2O2}$ by 180°, and the third clock signal SELB is obtained by inverting the second clock signal SELA. Furthermore, the above signals may be generated by and supplied from the control signal generator 149 (FIG. 14).

Figure 20:
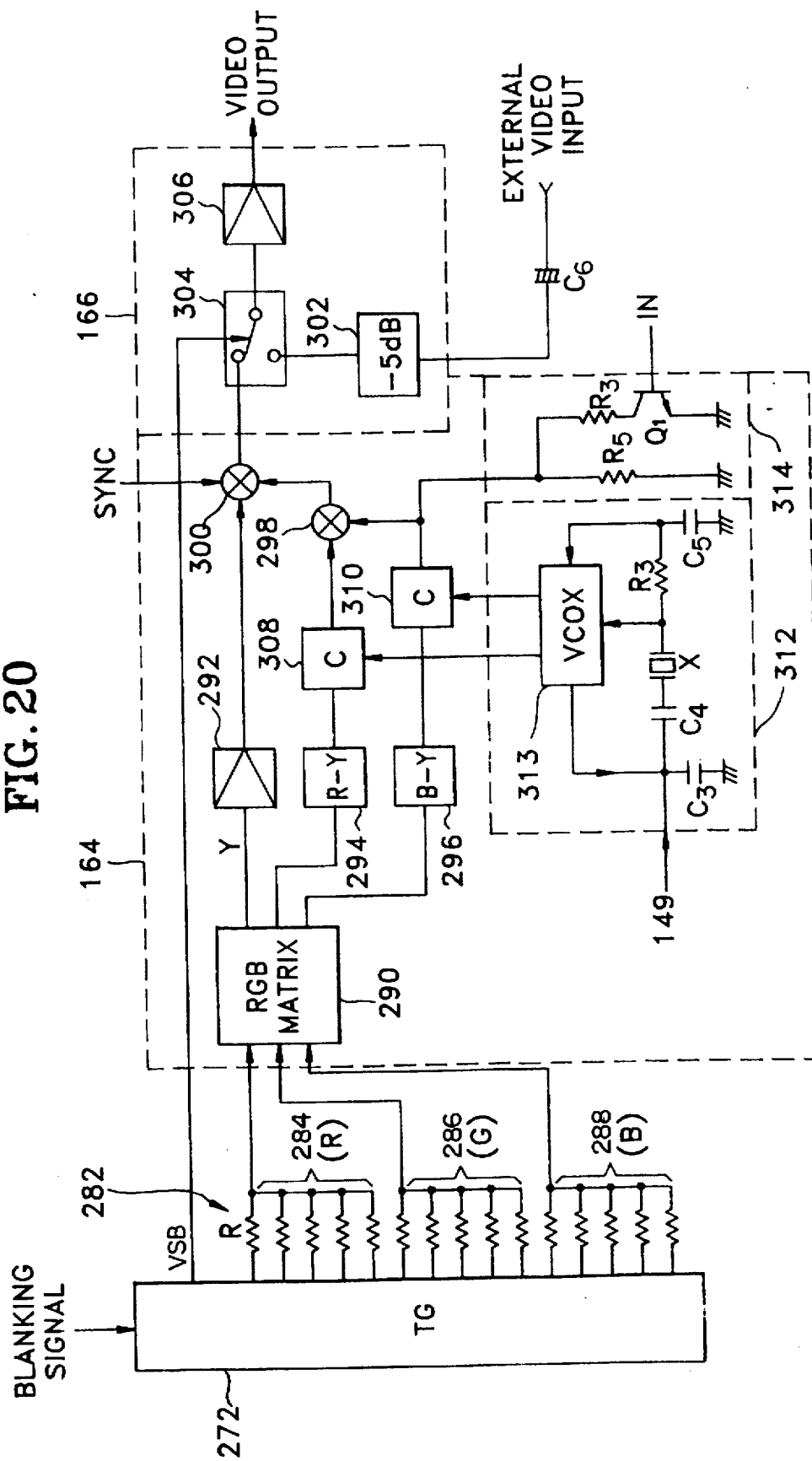
FIG. 20 is block diagram of the video converter and the superimposing means shown in FIG. 14.

FIG. 20 illustrates the video converter (e.g. an NTSC encoder) 164 (FIG. 14) and the superimposing means 166 (FIG. 14) in more detail. As shown in the figure, the video converter 164 comprises an RGB matrix 290, a luminance signal amplifier 292, an R-Y modulator 294, a B-Y modulator 296, first and second mixers 298 and 300, first and second compensators 308 and 310, a phase matching portion 312, and burst level adjustment means 314. The superimposing means 166 comprises an attenuator 302, an image signal selector 304, and an output amplifier 306.

FIG. 20 also shows the transmission gate 272 of the video memory 162 (FIG. 18) in more detail. As mentioned above, the transmission gate 272 outputs 16-bits of data PPD from the fourth data bus 280 of the video memory 162 in response to the blanking signal BLK. The 16-bits of data PPD comprise a video selection bit VSB and RGB data containing five bits of red data R, five bits of green data G, and five bits of blue data B.

When the video selection bit VSB equals "0", an internal image signal output from the video memory is displayed on the display. On the other hand, when the video selection bit VSB equals "1", an external image signal supplied via the video input port 178 (FIG. 14) is displayed.

The red, green, and blue data R, G, and B are output from the gate 272 to a signal synthesizer 282. The synthesizer comprises a red five-resistor array 284, a green five-resistor array 286, and blue five-resistor array 288 which respectively receive the five bits of red data R, the five bits of green data G, and the five bits of blue data B and generate synthesized R, G, and B signals.

The video converter 164 inputs the synthesized R, G, and B signals via the RGB matrix 290, and the RGB matrix 290 generates a luminance signal Y, first color difference signal R-Y, and second color difference signal B-Y. The luminance signal Y is output to the luminance amplifier 292 which amplifies the signal Y to produce an amplified luminance signal. The first color difference signal R-Y is output to the R-Y modulator 294 which converts the color difference signal R-Y into a first modulated color signal. The second color difference signal B-Y is output to the B-Y modulator 296 which converts the color difference signal B-Y into a second modulated color signal. The first and second modulated color signals are compensated by the first and second compensators 308 and 310 in order to prevent the phase of the color signals from being distorted when such signals are superimposed on another signal. Furthermore, the compensators 308 and 310 compensate the color signals based on first and second control signals generated by the phase matching portion 312.

The phase matching portion 312 comprises a voltage-controlled oscillator (VCOX) 313, a quartz-crystal oscillator X, capacitors C3, C4, and C5, and a resistor R3. The VCOX 313 inputs first and second color carrier waves, and the corresponding color carrier waves output from the VCOX 313 are phase-lock-controlled. As a result, the VCOX 313 generates the first and second control signals based on the phase-lock-controlled color carrier waves, and respectively outputs the control signals to the first and second compensators 308 and 310. After the compensators 308 and 310 phase-compensate the modulated color signals, the color signals are mixed by the first mixer 298 and are output as carrier color signals. The carrier color signals are mixed with the amplified luminance signal and a complex sync signal SYNC in the second mixer 300, and the mixed signals are output as a complex image signal.

The burst level adjustment means 314 comprises resistors R4 and R5 and a transistor Q1. The first end of the resistors R4 and R5 are each connected to the output port of the second compensator 310, and the other ends of the resistors R4 and R5 are respectively connected to ground and the source of the transistor Q1. The gate of the transistor Q1 is connected to an input port IN which inputs an image adjustment signal, and the drain of the transistor Q1 is connected to ground.

Based on the configuration above, the adjustment means 314 adjusts the signal level to the value of resistor R4 when the image adjustment signal is input through the input port IN and adjusts the signal level to the parallel resistance value of resistors R4 and R5 when the image adjustment signal is not input via the input port IN.

The superimposing means 166 inputs the complex image signal and the video selection bit VSB from the video converter 164 and inputs an external image signal. Specifically, the external image signal is input to the attenuator 302 via a connection capacitor C6 and attenuated into an attenuated external image signal. The attenuated external image signal and the complex image signal are input to the image signal selector means 304 which is switched at a high speed in response to the value of the video selection bit VSB. As a result, pixels of the complex image signal and corresponding pixels of the attenuated external image signal are superimposed and output from the selector means 304 as a superimposed image signal. Subsequently, the superimposed image signal is amplified by the output amplifier 306 as a video output signal.

Figure 21:
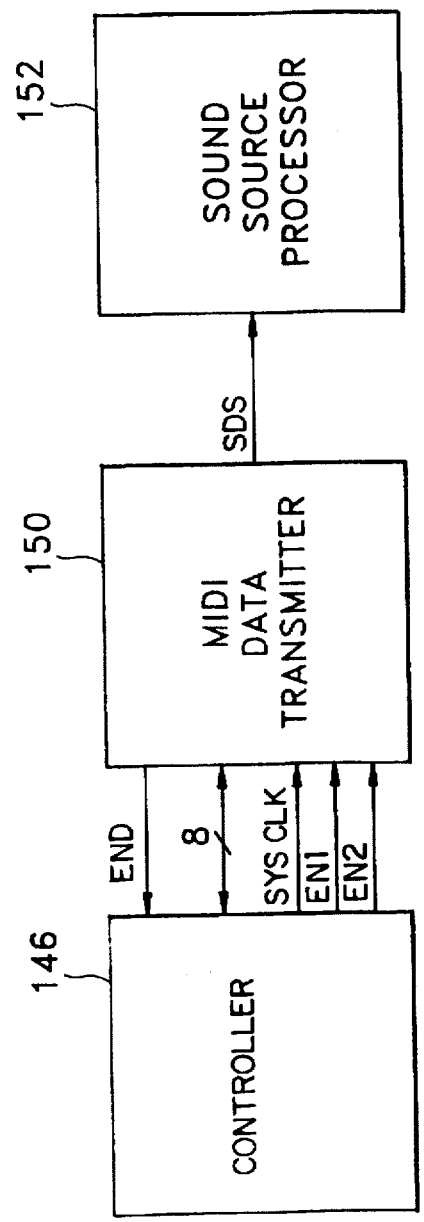
FIG. 21 is a block diagram of the interrelation of the controller, the MIDI data transmitter, and the sound source processor shown in FIG. 14.

FIG. 21 shows the interrelation of the controller 146, the MIDI data transmitter 150, and the sound source processor 152 (FIG. 14) in greater detail. In particular, the controller 146 outputs an 8-bit parallel data signal, a system clock signal SYS CLK, and first and second input enable signals EN1 and EN2 to the MIDI transmitter 150. Furthermore, the MIDI data transmitter 150 transmits a data transmission end signal END to the controller 146 and a 10-bit serial data signal SDS to the sound source processor 152.

Figure 22:
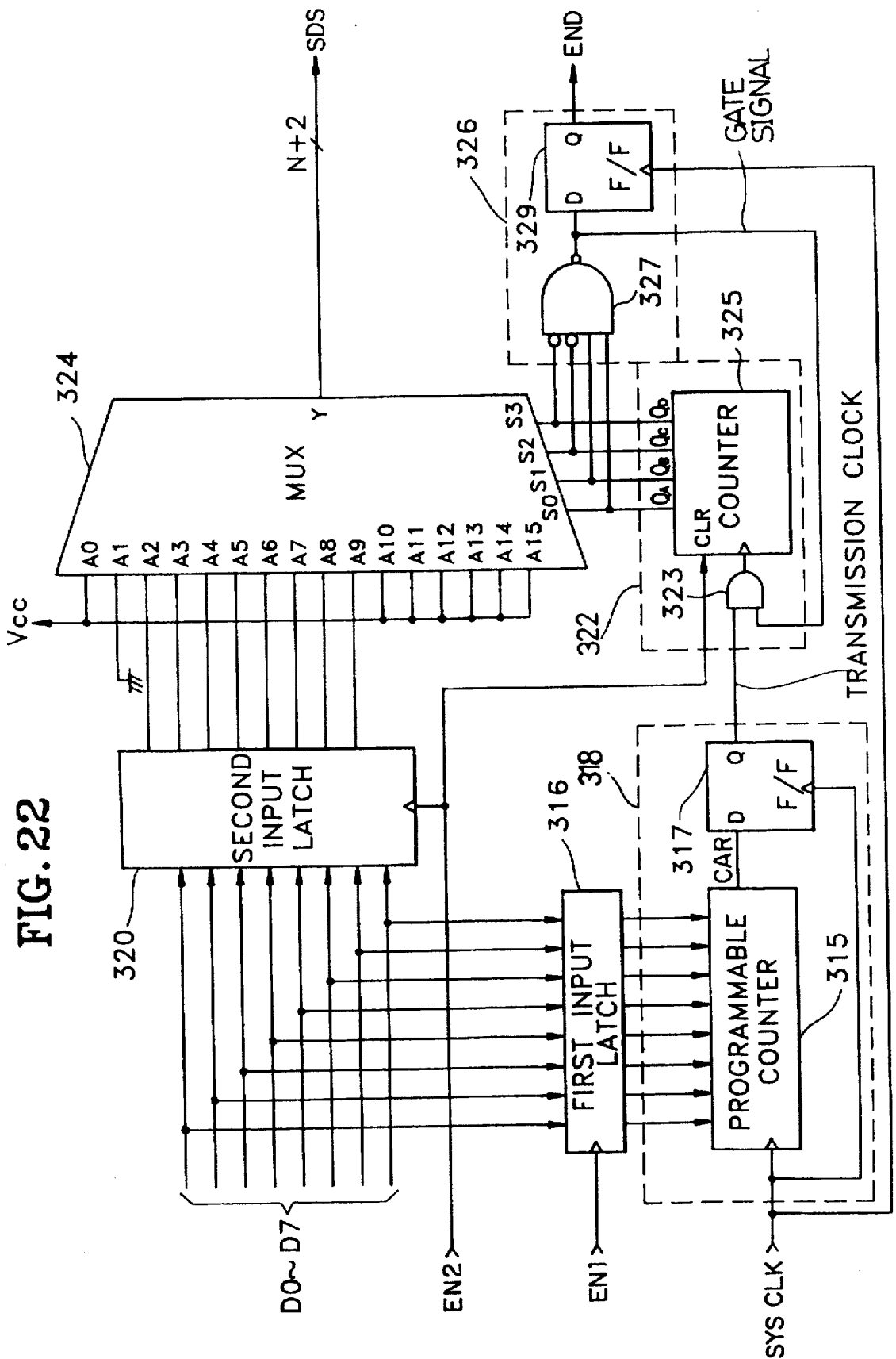
FIG. 22 is a block diagram of the MIDI data transmitter shown in FIG. 14 and FIG. 21.

FIG. 22 further illustrates the MIDI data transmitter 150. As shown in the figure, the transmitter 150 comprises a first input latch 316, a transmission clock generation means 318, a second input latch 320, an output selection signal generation means 322, a parallel to serial converter 324, and a transmission end signal generation means 326.

The first input latch 316 inputs the 8-bit parallel data D0 to D7 output from the controller 146 and latches the data D0 to D7 in accordance with the first input enable signal EN1. In addition, the enable signal EN1 causes the latch 316 to latch the data D0 to D7 when the controller 146 outputs time data D0 to D7 to the MIDI transmitter 150.

The transmission clock generation means 318 comprises a programmable counter 315 and a sixth flip-flop 317. The programmable counter 315 inputs the time data D0 to D7 output from the first input latch 316 as an initial value and sequentially increases the initial value in accordance with the system clock signal SYS CLK output from the controller 146. Furthermore, when a carry signal CAR is generated by the counter 315, the counter 315 reloads the time data D0 to D7 as an initial value. The sixth flip-flop 317 inputs the carry signal CAR, synchronizes the carry signal CAR with the system clock signal SYS CLK, and outputs the synchronized signal as a transmission clock signal.

The output selection signal generation means 322 comprises an AND gate 322 and a counter 325. The AND gate 322 inputs the transmission clock signal from the transmission clock generation means 315 and a gate signal from the transmission end signal generation means 326 and outputs a gated transmission signal when the transmission clock signal and the gate signal both equal "1". The counter 325 inputs the second input enable signal EN2 via a clear port CLR and inputs the gated transmission signal via a count port. In addition, the value of the counter 325 is reset to a predetermined initial value 1010 when the second enable signal EN2 is input and sequentially increments the initial value 1010 in accordance with the gated transmission clock signal. Furthermore, the current value of the counter 325 is output as an output selection signal ($Q_A$, $Q_B$, $Q_C$, and $Q_D$). Based on the configuration above, after the second enable signal EN2 is input, the counter 325 sequentially outputs the following values as the output selection signal in synchronicity with the gated transmission signal:

1010→1011→1100→1101→1110→1111→0000→0001→0010→
0011→0100→0101→0110→0111→1000→1001→
1010→1100→etc.

The second input latch 320 inputs the 8-bit parallel data D0 to D7 from the controller 146 and latches the data D0 to D7 in accordance with the second input enable signal EN2. In addition, the enable signal EN2 causes the latch 320 to latch the data D0 to D7 when the controller 146 outputs transmission data D0 to D7 to the MIDI transmitter 150.

The parallel-to-serial convertor 324 may be implemented by 16-to-1 multiplexer having input ports A0 to A15, an output port Y, and control ports S0 to S3. The input ports A0 and A10 to A15 are connected to Vcc, and the input port A1 is connected to ground. Furthermore, the input ports A2 to A9 respectively input the transmission data D0 to D7 which is output from the second input latch 320. The output selection signal from the output selection signal generation means 322 is input to the control ports S0 to S3 and instructs the parallel-to-serial convertor 324 to output a selected bit of the transmission data D0 to D7 via the output port Y. Since the value of the output selection signal is sequentially incremented as described above, the bits of the transmission data D0 to D7 that are respectively input to the ports A2 to A9 are sequentially output via the output port Y as part of the serial data signal SDS.

The transmission end signal generation means 326 comprises a gate circuit 327 and a seventh flip-flop 329. The gate circuit 327 generates a low gate signal if the value of the output selection signal is 1100, and the seventh flip-flop 329 synchronizes the gate signal with the system clock signal SYS CLK to generate the transmission end signal END.

A description of the operation and effects of the present invention will be described below in conjunction with FIGS. 23A–23E. In particular, FIG. 23A shows a waveform of the first input enable signal EN1, FIG. 23B shows a waveform of the second input enable signal EN2, FIG. 23C shows a waveform of the 8-bit parallel data D0 to D7 output from the controller 146, FIG. 23D shows a waveform of the 10-bit serial data signal SDS output from the parallel to serial converter 324, and FIG. 23E shows a waveform of the transmission end signal END output from the transmission end signal generation means 326.

Figure 23:
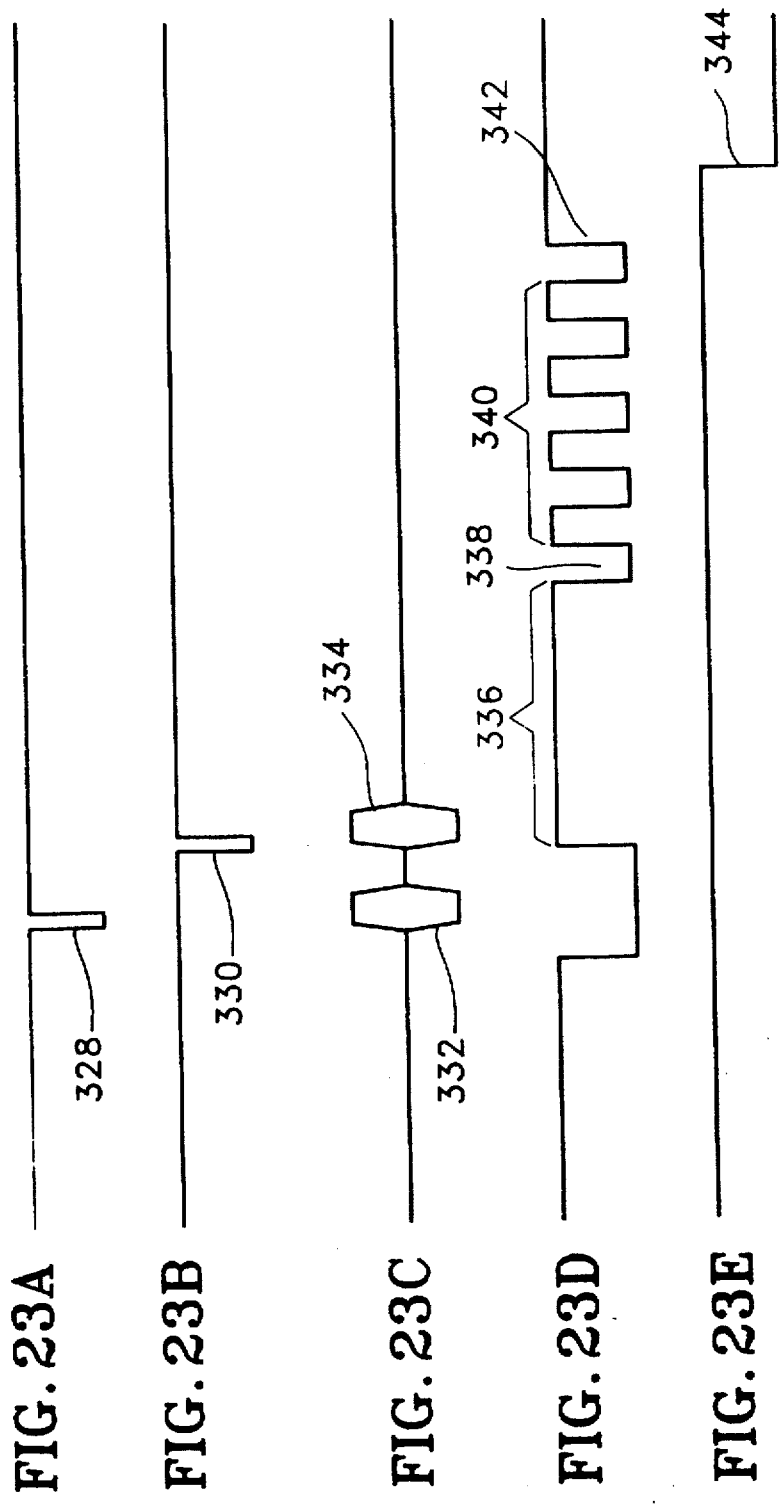
FIG. 23A is a waveform diagram of a first input enable signal input by the MIDI data transmitter illustrated in FIG. 22.
FIG. 23B is a waveform diagram of a second input enable signal input by the MIDI data transmitter illustrated in FIG. 22.
FIG. 23C is a waveform diagram of parallel time data and parallel transmission data used by the MIDI data transmitter illustrated in FIG. 22.
FIG. 23D is a waveform diagram of a serial data signal output by the MIDI data transmitter illustrated in FIG. 22.
FIG. 23E is a waveform diagram of a transmission end signal used by the MIDI data transmitter illustrated in FIG. 22.

The controller 146 outputs the parallel time data 332 (FIG. 23C) to the MIDI transmitter 150, and the transmitter 150 latches the parallel time data 332 in the first input latch 316 at the trailing edge 328 of the first input enable signal EN1 (FIG. 23A). Then, the controller 146 outputs the parallel transmission data 334 (FIG. 23C) to the MIDI transmitter 150, and the transmitter 150 latches the parallel transmission data 334 in the second input latch 320 at the trailing edge 330 of the second input enable signal EN2 (FIG. 23B).

Furthermore, the trailing edge 330 of the second input enable signal EN2 also resets the counter 325 of the output selection signal generation means 322 so that the counter outputs the output selection signal 1010 as its initial value. Consequently, the gate signal output from the transmission end signal generation means 326 is high, and the transmission clock signal generated by the transmission clock generation means 318 is output to the clock port of counter 325.

As a result, the counter 325 sequentially increments the value of the output selection signal from the initial value 1010. As the output selection signal increases from 1010 to 0000, the parallel-to-serial converter 324 outputs a high signal 336 (FIG. 23D) via the output port Y. Subsequently, when the selection signal changes to 0001, a logic low start signal 338 is output from the port Y. Then, when the value of the output selection signal increases from 0010 through 1001, the parallel transmission data 10101010 latched in the second input latch 320 is serially output as serial data 340 (FIG. 23D) via the output port Y. Finally, when the value of the selection signal equals 1010, an ending signal 342 is output via the port Y, and when the value equals 1100, the gate signal output from transmission end signal generation means 326 becomes low. Consequently, the transmission clock signal output from the transmission clock generation means 315 is no longer supplied to the counter 325, and the transmission end signal END output from the transmission end signal generation means becomes a low signal 344 (FIG. 23E).

Figure 24:
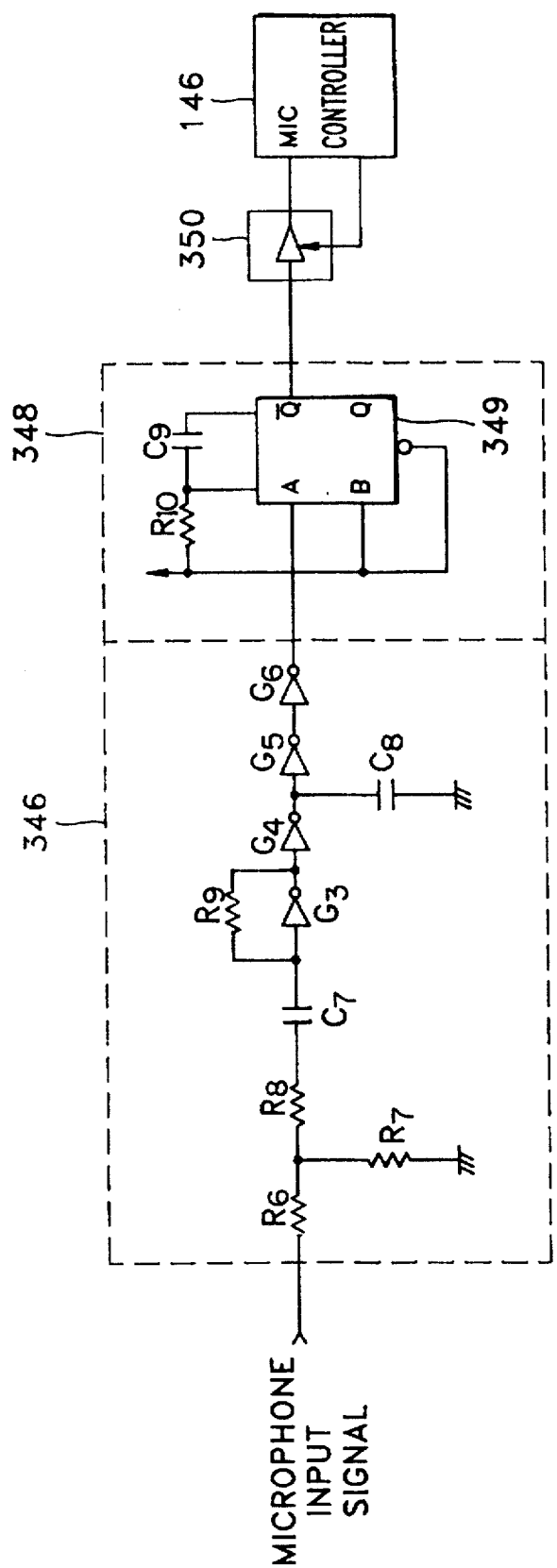
FIG. 24 is a block diagram of the microphone sound detector shown in FIG. 14.

FIG. 24 is a circuit diagram of the microphone sound detector 160 (FIG. 14) of the present invention. As illustrated in the figure, the microphone sound detector 160 comprises a input detection means 346, a wave convention means 348, and a transmission gate 350.

The input detection means 346 comprises resistors R6 to R9, capacitors C7 and C8, and inverters G3 to G6. The input detection means 346 inputs a microphone input signal via the microphone sound input port 158 (FIG. 14), and the level of the input signal is reduced to predetermined level by the resistors R6 and R7 to produce a low level input signal. Subsequently, the low level input signal is input to the inverter G3 via the resistor R8 and the capacitor C7, and the inverter G3 inverts the low level input signal to produce an inverted low level input signal. Furthermore, the inverted low level input signal is fed back to the input port of the inverter G3 via the resistor R9. As a result, the inverted low level input signal is biased to the threshold level of the inverter G3 which causes a high frequency oscillation signal to be produced.

The high frequency oscillating signal is inverted by the inverter G4, applied to the capacitor C8, and inverted two more times by the inverters G5 and G6. Then, the inverter G6 outputs the high frequency oscillating signal as a input detection signal. In other words, the high frequency oscillating signal is output as the input detection signal when the level of the input signal is near the threshold level of the inverter G3.

The wave convention means 348 comprises a monostable multi-vibrator 349, a resistor R10, and a capacitor C9. The monostable vibrator 349 inputs the high frequency oscillating signal as a trigger signal and generates a rectangular pulse having a pulse width that corresponds to the RC time constant of the resistor R10 and capacitor C9. Subsequently, the rectangular signal is output to the microphone input port MIC of the controller 146 via the transmission gate 350.

Figure 25A:
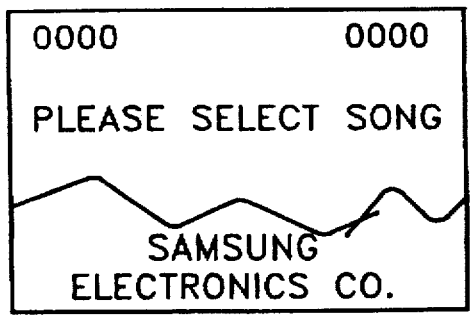
FIG. 25A shows an initial background image displayed by the CD-OK reproducing apparatus during a song selection mode.

The operation of the reproduction apparatus described above will be explained below. After a speaker and a television receiver or monitor are respectively connected to the audio and video output ports 140 and 180 and before the apparatus has been turned on, the apparatus is in a standby state. In such state, the sub-controller 126 samples the output of the command input unit 132 to determine if the power key 76 has been depressed. When the power key 76 is depressed, power is supplied to the main controller 124 and various other circuits. As a result, the main controller 124 outputs a system reset command to controller 146, and the controller 146 reads initial image information from the system memory unit 148 and instructs various circuits to display the initial image shown in FIG. 25A on the monitor.

Then, the main controller 124 inputs a command from the disc deck unit 128 via the sub-controller 126 to determine if a disc is contained in the disc tray 78 of the apparatus. If a disc is not located in the tray 78, the main controller 124 commands the selected song number display 102 on the front panel of the apparatus to display the word DISC in order to instruct a user to place a disc in the tray 78. Subsequently, when a user desires to place a disc in the tray 78 and pushes the open/close switch 82, the sub-controller 126 displays the word OPEN on the song number display 102 and opens the tray 78. Also, when the tray 78 is open, the main controller 124 outputs a command to the controller 146, and the controller 146 overlays the words TRAY IS OPEN on the initial image illustrated in FIG. 25A. After the user places a disc in the tray 78 and presses open/close switch 82 (or manually pushes the tray 78), the sub-controller 126 instructs the disc deck driver 128 to close the tray and displays the number of the disc on the selected position display 98 on the front panel.

Then, the main controller 124 instructs the servo controller 121 and the optical pickup 118 to read the table of contents information from the lead-in area (LIA) of the disc to identify the type of disc in the tray. If the disc is an CD-DA disc or a CDG disc, the main controller 124 turns on the CD indication lamp from among the function indication lamps 104. Furthermore, the total number of songs recorded on the disc is displayed on the selected song number display 102. Also, the main controller 124 outputs control signals to the audio and video selectors 136 and 174 so that the selectors 136 and 174 output audio and video signals generated by the CD reproducing apparatus. (In FIG. 14, the selectors 136 and 174 would be shifted to their non-illustrated positions). Subsequently, the apparatus displays a blue background image instead of the initial image shown in FIG. 25A. If the user presses an up/down key to select a particular song recorded on the CD and/or presses the reproduction key to play such song, the number of the particular song and the cumulative number of disc revolutions completed as the particular song is being played are displayed on the selected song number display 102. Moreover, the audio data corresponding to the particular song is read from the CD and the audio signals relating to the song are output via the audio ports 140.

If the disc in the tray 78 is a CDG disc, the audio data is reproduced through the D/A convertor 134 as an audio signal and output through audio selector 136 to the audio output ports 140. Also, graphical data recorded on the disc is reproduced by the digital signal processor 122 and decoded into a video signal via the CDG decoder 182. Subsequently, the video signal is output via the video selector 174 to the video output port 180.

If a CD-OK disc is concurrently located in the tray 78 as the CDG disc is being reproduced, the user can reproduce data stored on the CD-OK disc by pressing the disc selection switch 80. After the switch 80 is depressed, the controller 146 overlays the characters DISCS ARE BEING EXCHANGED on the initial image illustrated in FIG. 25A. Also, the CD-OK indication lamp from among the function indication lamps 104 is illuminated, and the numerals "0" and "0000" are displayed on the selected song number display 102.

In addition, the main controller 124 outputs control signals to the audio and video selectors 136 and 174 so that the selectors 136 and 174 output audio and video signals generated by the CD-OK reproducing apparatus. (In FIG. 14, the selectors 136 and 174 would be shifted to their illustrated positions). Also, the main controller 124 inputs the starting addresses of first and second table areas 34 and 36 and respectively reads the background image index table 35 and the music index table 37 from the table areas 34 and 36 of the CD-OK disc.

Afterwards, the tables 35 and 37 are output to the controller 146 via the CD-ROM decoder 142 and the interfacing portion 144. Then, the controller 146 stores the tables 35 and 37 in the system memory unit 148 in a CD-OK format and displays the image illustrated in FIG. 25A.

In addition to the functions above, the CD-OK reproducing apparatus is capable of operating in several different modes. For example, the apparatus may operate in a song selection mode, a reservation mode, or a menu mode, and the specific functions of each mode are described below.

1) Song Selection Mode

Figure 25D:
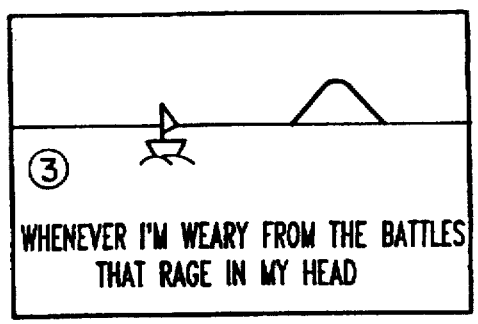
FIG. 25D shows a first prelude background image upon which corresponding lyrics are superimposed.
Figure 25B:
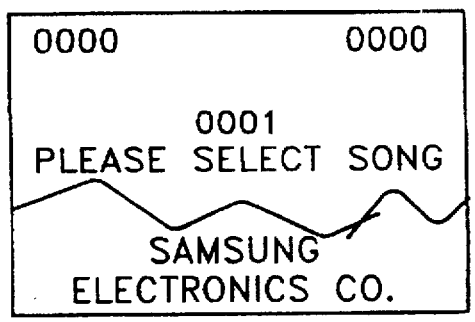
FIG. 25B shows the initial image displayed by the CD-OK reproducing apparatus after a song selection number has been input.
Figure 25E:
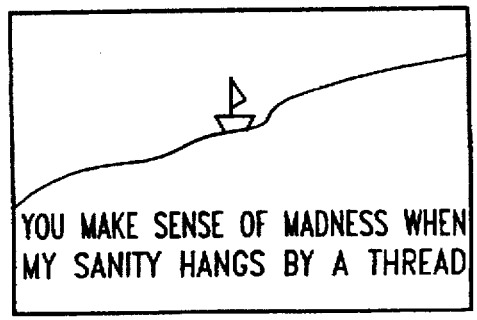
FIG. 25E shows a second prelude background image upon which corresponding lyrics are superimposed.

In order to select a particular song from the CD-OK disc, the user sequentially inputs the digits of the index number 58 (i.e. song selection number) which corresponds to the particular song. Moreover, as the digits are sequentially entered, they are displayed on the selected song number display 102. For example, if the user desires to reproduce a song corresponding to the song selection number "0001", the user sequentially inputs the digits "0"-"0"-"0"-"1". As a result, the indicator of the display 102 changes from "0000" to "0001", and the color of the indicator changes from white to red. If the four digits of the song selection number are not input within a predetermined period of time, the indicator of the selected song number display 102 is reset to "0000". If the song selection number "0001" is input and the reproduction key is depressed within a certain time, the song selection number "0001" is displayed in the center of the screen as shown in FIG. 25B.

After the song selection number "0001" is correctly input and the reproduction key is depressed, the selection number "0001" is transmitted to the controller 146, and the controller 146 reads the starting address of the song corresponding to the index number 58 "0001" from the music index table 37. Subsequently, the starting address of the song is output to the main controller 124, and the main controller reads the relevant music information from the second data area 40 of the CD-OK disc based on the starting address. The music information is then supplied to the controller 146 via the CD-ROM decoder 142, and the controller 146 stores the music information in the system memory unit 148 in a CD-OK format.

Afterwards, the controller 146 reads the information contained in the background image sequence table 74 of the stored music information, and sends such information to the main controller 124. Then, the main controller 124 obtains the starting address of a first background image from the background image index table 35 based on such information and reads the first background image from the first data area 38 of the CD-OK disc. Then, the first background image is output to the controller 146 via the CD-ROM decoder 142. The controller 146 processes and decodes the background image and stores the decoded background image data in the video memory 162.

Figure 25C:
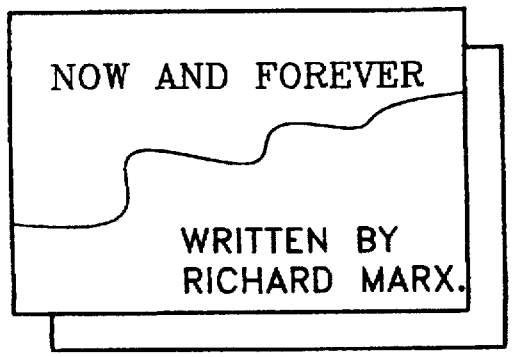
FIG. 25C shows a background image displayed by the CD-OK reproducing apparatus upon which the title and singer of a selected song is superimposed.
Figure 25F:
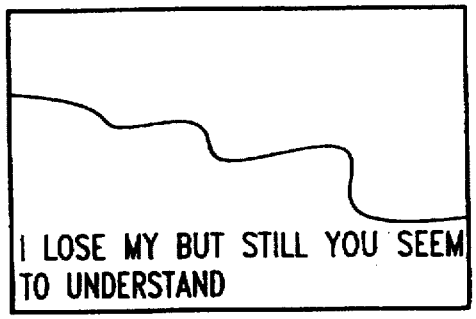
FIG. 25F shows a third prelude background image upon which corresponding lyrics are superimposed.

After two background images have been stored in the video memory 162, the controller 146 reads data corresponding to the title, songwriter, composer, and singer of the selected song from the lyrics data 72 contained in the music information and overlays such data upon the background image as shown in FIG. 25C. The video convertor (e.g. NTSC encoder) 164 converts the data into a video signal, and the video signal is output through the video output port 180 via the superimposing means 166, video selector 174, and video output amplifier 176.

In addition, the controller 146 reads the song accompaniment data 70 from the music information and supplies such data to the sound source processor 152 via the MIDI data transmitter 150. The processor 152 processes the song accompaniment data and outputs the processed data to the audio convertor 154. Then, the convertor 154 converts the processed data into an audio signal and outputs the audio signal to a speaker via the audio selector 136 and the audio output ports 140.

Consequently, the prelude of the song begins to be reproduced as the title, songwriter, composer, and singer of the song are displayed on the first background image. Afterwards, a couple screens of background images that are synchronized with the prelude are sequentially displayed as the prelude continues to be reproduced. As the portion of the prelude corresponding to the lyrics of the song is about to be played, the first set of lyrics and a countdown to the instant when the lyrics should be sung are displayed on the first prelude background image as shown in FIG. 25D. After the countdown counts "3"-"2"-"1"-"0", each word of the displayed lyrics change color as, the word is supposed to be sung by the user.

Figure 26A:
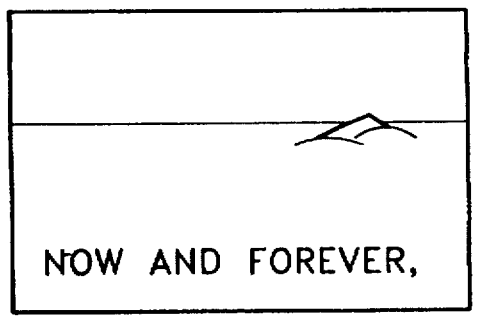
FIG. 26A shows a fourth prelude background image upon which corresponding lyrics are superimposed.
Figure 26B:
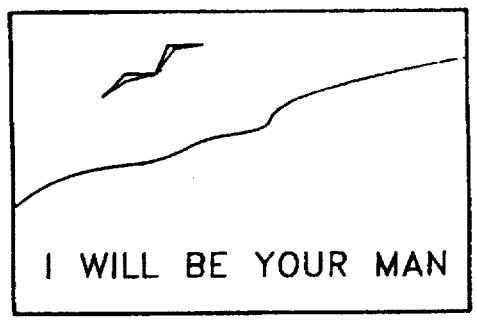
FIG. 26B shows a fifth prelude background image upon which corresponding lyrics are superimposed.
Figure 26C:
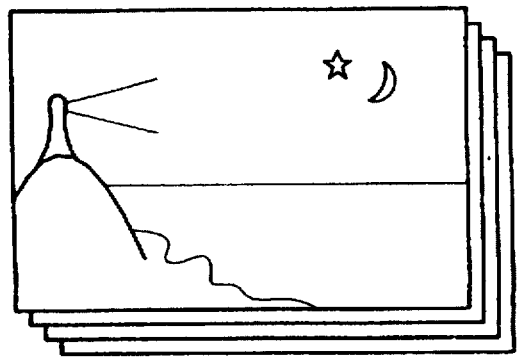
FIG. 26C shows a various interlude background images.
Figure 26D:
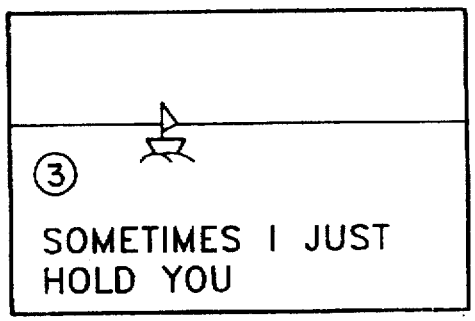
FIG. 26D shows a first postlude background image upon which corresponding lyrics are superimposed.
Figure 26E:
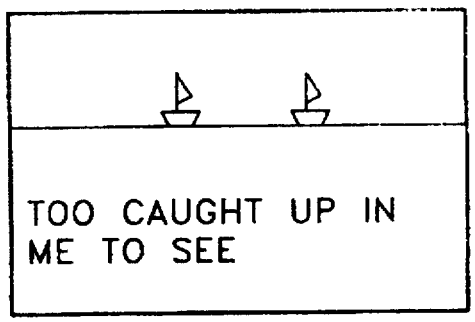
FIG. 26E shows a second postlude background image upon which corresponding lyrics are superimposed.
Figure 26F:
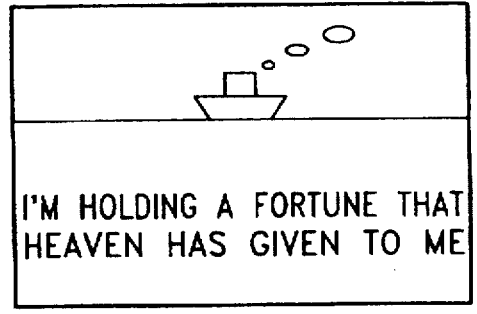
FIG. 26F shows a third postlude background image upon which corresponding lyrics are superimposed.

After various prelude background images and their corresponding lyrics are displayed as shown in FIGS. 25D, 25E, 25F, 26A, and 26B, the interlude begins, and a few screens of background images that are synchronized with the interlude are displayed as shown in FIG. 26C. After the interlude if finished, the postlude begins to be reproduced. As the portion of the postlude which corresponds to the lyrics of the song is about to be played, the set of lyrics and a countdown to the instant when the lyrics should be sung are displayed on the postlude background image as shown in FIG. 26D. As in the case above, the countdown counts "3"-"2"-"1"-"0", and each word of the displayed lyrics change color as the word is supposed to be sung by the user. After various postlude background images and their corresponding lyrics are displayed as shown in FIGS. 26E, 26F, 27A, and 27B, three screens of background images which correspond to the ending of the song are displayed as shown in FIG. 27C.

Figure 27A:
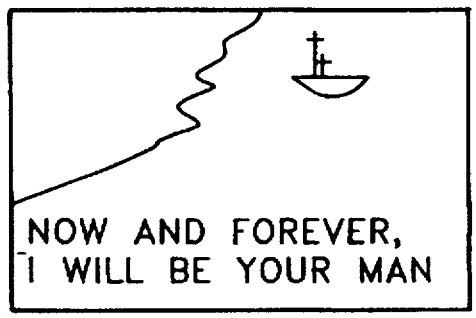
FIG. 27A shows a fourth postlude background image upon which corresponding lyrics are superimposed.
Figure 27D:
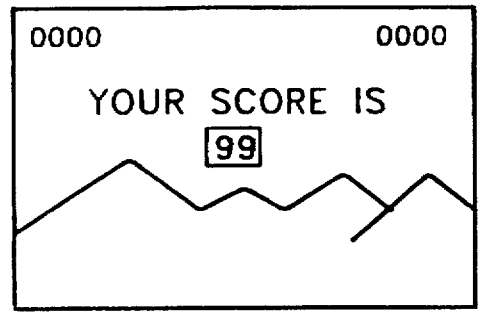
FIG. 27D shows a background image containing a score of how well a user sang the selected song.
Figure 27B:
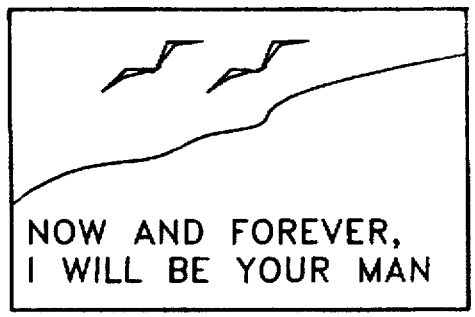
FIG. 27B shows a fifth postlude background image upon which corresponding lyrics are superimposed.
Figure 27C:
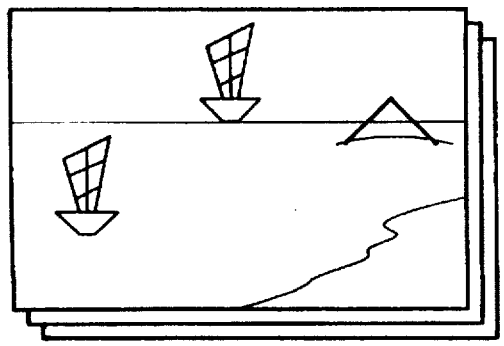
FIG. 27C shows various background images which correspond to the end of the selected song.
Figure 28:
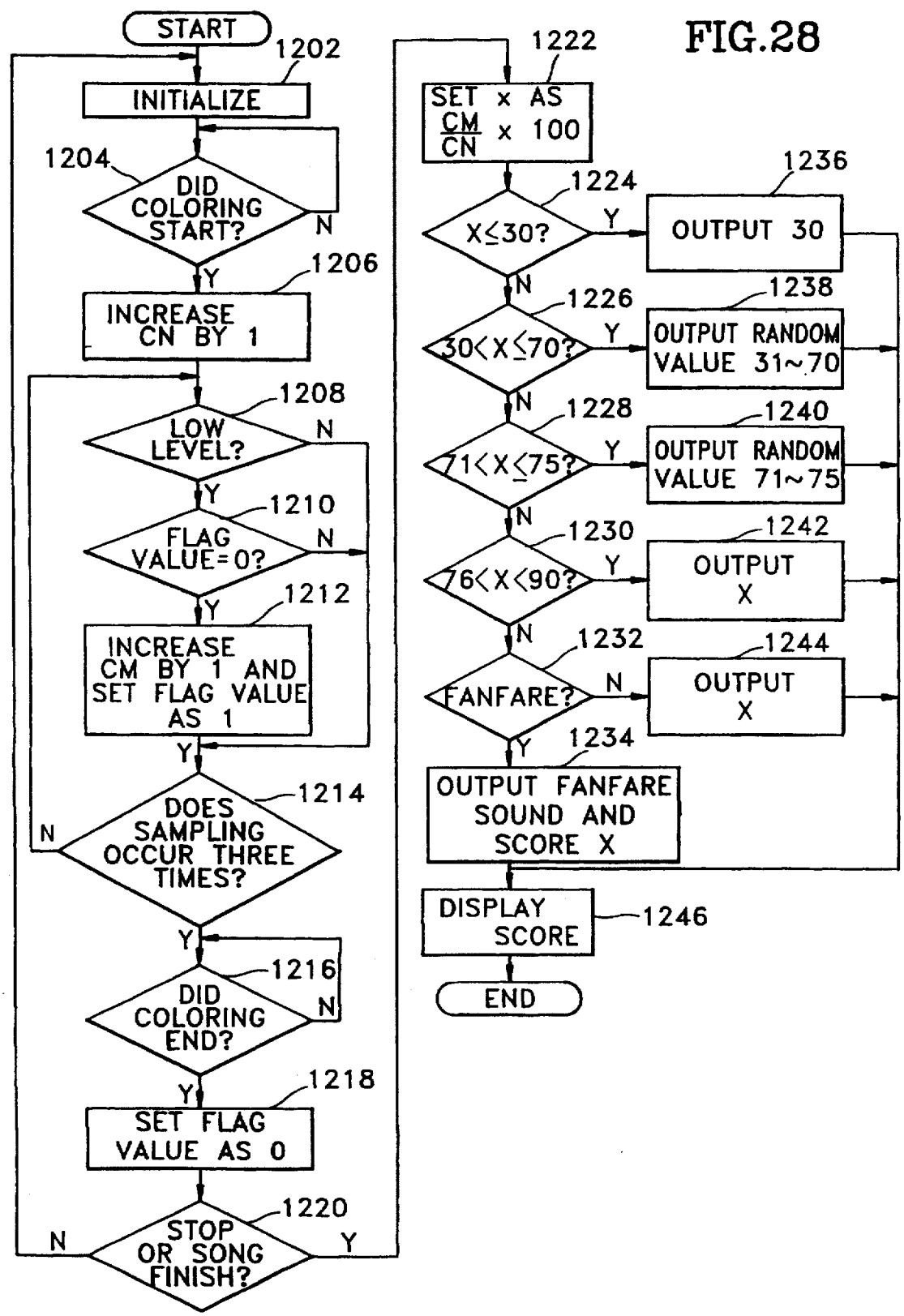
FIG. 28 is a flow chart of a point deciding routine for determining how well the user sang the selected song.

After the entire song has been reproduced, the reproduction apparatus determines how well the user sang the song and displays a resultant score on the screen as shown in FIG. 27D. A point deciding routine for determining how well the user sang the song is illustrated in FIG. 28

As shown in the figure, after a particular song has been selected to be reproduced, various variables and parameters are initialized (step 1202). For example, the coloring speed at which the reproduction apparatus will incrementally color the letters of the lyrical text displayed on the screen is determined. In particular, the coloring speed for each letter or word of text is initialized so that the reproduction apparatus correctly prompts the user sing the words of the lyrical text when the corresponding musical portions of the song are being reproduced. After all of the necessary parameters and variables have been initialized, the apparatus determines if the apparatus has prompted the user to begin singing by coloring the first letter of the first word of lyrical text displayed on the screen (step 1204).

If the coloring of the first letter has begun, a first counting value CN is incremented by 1 (step 1206). Then, the controller 146 determines whether the level of the microphone output signal output from the microphone sound detector 160 is a low level signal (step 1208). As described above, the signal output from the detector 160 is low when the user sings into a microphone connected to the microphone sound input port 158 (FIG. 14).

If the microphone output signal is low, the controller 146 determines if a flag value FG1 equals "0" (step 1210). If the flag value FG1 equals "0", a second counting value CM is incremented by 1 and the flag value FG1 is set to "1" (step 1212). The counting value CM is incremented in step 1212 to indicate that the user has sung the portion of the lyrical text at the precise moment that the reproducing apparatus prompted the user to sing the portion of lyrical text.

If the microphone, output signal was not low at step 1208, if the flag value FG1 did not equal "0" at step 1210, or if step 1212 has been executed, the controller 146 proceeds to step 1214. In step 1214, the controller 146 determines if it has previously sampled the microphone input port MIC three times to determine if the microphone output signal is low. By sampling the port MIC three times, the controller 146 is able to definitely ascertain if the microphone output signal was low at any time during the period when the user should have sung the portion of the lyrical text which was most recently colored.

If the controller 146 has not sampled the port MIC three times, step 1208 is repeated. On the other hand, if the port MIC has been sampled three times, the controller 146 determines if the coloring of the letter or portion of the lyrical text has been completed (step 1216). After the letter or portion of the lyrical text has been colored, the flag value FG1 is set to "0" (step 1218), and the controller 146 determines if a stop command has been input or if the selected song has finished playing (step 1220).

If a stop command has not been input and if the song has not finished playing, step 1202 is executed again. On the other hand, the controller 146 proceeds to step 1222 and calculates a ratio X as follows. First, the second counting value CM (i.e. the number of instances that the user timely sung a letter or portion of the lyrical text) is divided by the first counting value CN (i.e. the number of instances that the user had the opportunity to timely sing a letter or portion of the lyrical text) to produce a resultant value. Then, the resultant value is multiplied by 100 to determine the ratio X.

If the value of the ratio X is less than or equal to 30 (step 1224), the user's score is set to 30 (step 1236), and the controller 146 displays a score of "30" on the screen (step 1246). If the value of the ratio X is greater than 30 and less than or equal to 70 (step 1226), the user's score is set to a random value between 31 and 70 (step 1238), and the controller 146 displays the user's score on the screen (step 1246). If the value of the ratio X is greater than 71 and less than or equal to 75 (step 1228), the user's score is set to a random value between 71 and 75 (step 1240), and the controller 146 displays the user's score on the screen (step 1246). If the value of the ratio X is greater than 76 and less than or equal to 90 (step 1230), the user's score is set to the value of the ratio X (step 1242), and the controller 146 displays the user's score on the screen (step 1246).

If the ratio X is greater than 90, the controller 146 determines if the fanfare option has been set by the user (step 1232). If the option has been set, the controller 146 instructs the reproduction apparatus to output a fanfare sound (e.g. the sound of a crowd cheering) via the audio output ports 140 and sets the user's score equal to the value of the ratio X. Subsequently, the user's score is displayed on the screen while the fanfare sound is being output (step 1246). On the other hand, if the fanfare option has not been set, the user's score is set to the value of the ratio X (step 1244), and the controller 146 displays the user's score on the screen (step 1246). As indicated above, the user's score will be poor if the user sings many portions of the song out of rhythm and at the wrong times.

2) Reservation mode

Figure 29A:
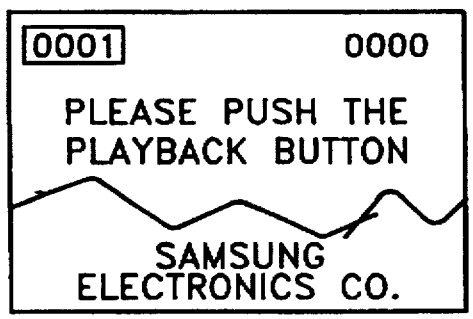
FIG. 29A shows an initial background image displayed by the CD-OK reproducing apparatus during a reservation mode.

The reservation mode enables a user to select one or more songs and have the reproducing apparatus play the selected songs at a later time. In order to reserve a particular song, the user depresses the reservation key and enters an index number 58 (i.e. the song selection number "0001") listed in the music index table 37. As a result, the selected song number is displayed in red in a reservation displaying portion of the screen as shown in FIG. 29A. (For example, as illustrated in FIG. 29A, the reservation displaying portion is the upper left portion of the screen). Furthermore, the reproduction apparatus also displays the words PLEASE PUSH THE PLAYBACK BUTTON on the monitor and displays a "1" on the reserved song number display 100 of the front panel to indicate the number of songs that have been reserved.

Figure 29B:
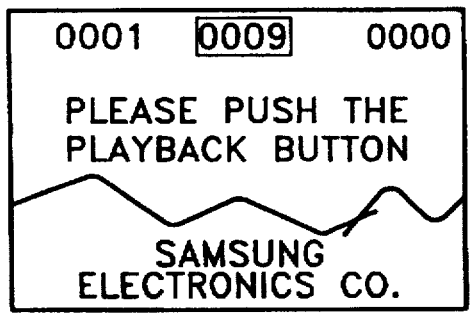
FIG. 29B shows a background image displayed by the CD-OK reproducing apparatus when two songs have been reserved during the reservation mode.

If the user desires to reserve a second song and inputs a second song selection number "0009", the display of the first song selection number "0001" changes from red to white, and the second song selection number "0009" is displayed in red on the reservation displaying portion to the right of the first song selection number "0001" as illustrated in FIG. 29B. Furthermore, up to nine songs can be reserved by the reproduction apparatus, and if commands are input to reserve another song after the ninth song is reserved, such commands are disregarded.

If a plurality of selected songs have been reserved and the reproduction key is input, the song which was reserved first is reproduced. In the current example, the song corresponding to the song selection number "0001" is reproduced first. After the first song begins to be reproduced, the song selection number "0001" is deleted from the reservation displaying portion and the remaining song selection number "0009" is shifted to the left. Also, the number displayed in the reserved song number display 100 on the front panel of the reproducing apparatus changes from "2" to "1".

After the first song has been reproduced, the apparatus again displays the words "PLEASE PUSH THE PLAYBACK KEY" on the monitor. Accordingly, when a user presses the reproduction key, the second reserved song corresponding to the song selection number "0009" is reproduced.

However, if the reproduction apparatus is set in a continual reservation mode, the reproduction apparatus does not display a message prompting the user to press the reproduction key after each reserved song has been played. As a result, the apparatus continuously reproduces all of the reserved songs without interruption. In order to set the apparatus in the continual reservation mode, the user depresses the continuation key from among the ten function keys 110. When the continual reservation mode is set, the continual reservation indication lamp from among the function indication lamps 104 illuminates.

In addition, the user can confirm a reserved song by pressing the confirm key from among the ten function keys 110. When the confirm key is repeatedly depressed, the numbers displayed on the reservation displaying portion of the monitor sequentially change from white to red.

Also, the user can cancel previously reserved songs by pressing the cancel key from among the ten function keys 110. When the cancel key is pressed, the most recently reserved song is cancelled, and the song selection number corresponding to the most recently reserved song is no longer displayed on the reservation displaying portion. After the most recently reserved song has been cancelled, the next most recently reserved song can be cancelled by pressing the cancel key again.

3) Menu Mode

Figure 30A:
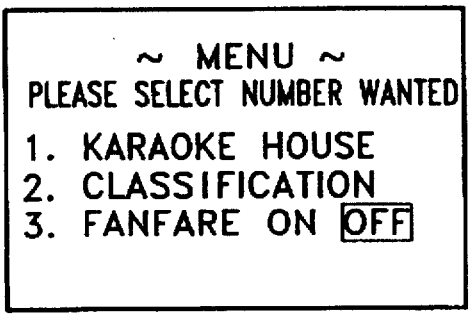
FIG. 30A shows a main menu displayed by the CD-OK reproducing apparatus during a menu mode.

The menu mode enables the user to display various menus and choose certain options from such menus to command the reproduction apparatus to operate in various manners. For example, if the user presses the menu key from among the ten function keys 110, the main menu shown in FIG. 30A is displayed on the screen of the monitor. The main menu contains a (1) KARAOKE HOUSE option, a (2) CLASSIFICATION option, and a (3) FANFARE ON/OFF option. Furthermore, the main menu displays the phrase PLEASE SELECT NUMBER WANTED in red letters to instruct the user to select one of the options above by pressing the corresponding numerical key.

If the user presses the numerical key "1", the KARAOKE HOUSE option is selected. As a result, the reproduction apparatus performs the same functions described above with respect to the song selection mode.

Figure 30B:
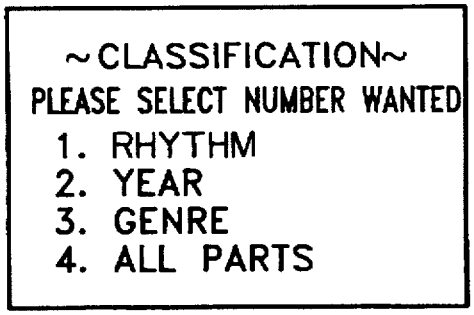
FIG. 30B shows a CLASSIFICATION menu displayed by the CD-OK reproducing apparatus during the menu mode.

If the user presses the numerical key "2", the CLASSIFICATION option is selected, and the CLASSIFICATION menu illustrated in FIG. 30B is displayed on the screen. The CLASSIFICATION option enables the user to sing songs which are randomly selected by the reproduction apparatus based on particular categories of music. For instance, as shown in the figure, the CLASSIFICATION menu contains a (1) RHYTHM category, a (2) YEAR category, a (3) GENRE category, and an (4) ALL PARTS category. Furthermore, the CLASSIFICATION menu displays the phrase PLEASE SELECT NUMBER WANTED in red letters to instruct the user to select one of the options above by pressing the corresponding numerical key.

If the user presses the numerical key "3" while the main menu is displayed, the FANFARE ON/OFF option is selected. Each time the FANFARE ON/OFF option is selected, the recording apparatus alternatively displays the word "ON" or "OFF" shown in the option in red letters. For example, as illustrated in FIG. 30A, the word "OFF" in the FANFARE ON/OFF option is displayed in red letters and the word "ON" in the option is displayed in white letters. However, if the user presses the numerical key "3", the word "OFF" will be displayed in white letters and the word "ON" will be displayed in red letters. Accordingly, if the word "ON" is displayed in red letters, the fanfare mode is set, and if the word "OFF" is displayed in red letters, the fanfare mode is not set.

Figure 31A:
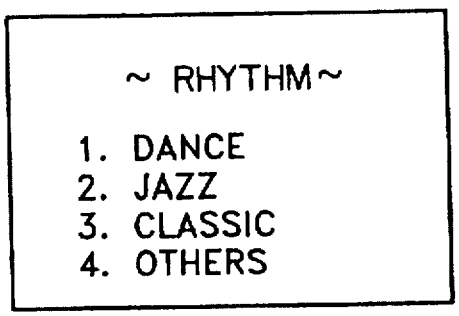
FIG. 31A shows a RHYTHM menu displayed by the CD-OK reproducing apparatus during the menu mode.

When the numerical key "1" is depressed while the CLASSIFICATION menu is displayed, the RHYTHM menu illustrated in FIG. 31A is displayed on the screen. The RHYTHM feature instructs the reproduction apparatus to randomly select songs based on the rhythm of the song. For example, the RHYTHM menu contains a (1) DANCE category, a (2) JAZZ category, a (3) CLASSIC category, and an (4) OTHERS category.

Figure 31D:
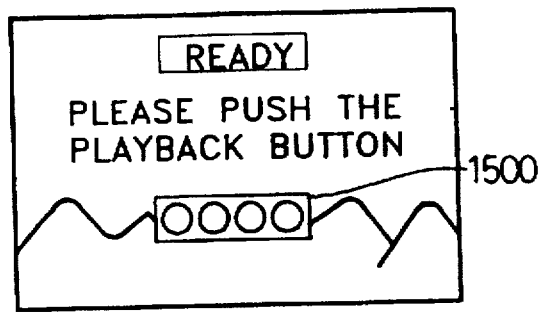
FIG. 31D shows information displayed by the CD-OK reproduction apparatus when the CLASSIFICATION feature has been selected.
Figure 31B:
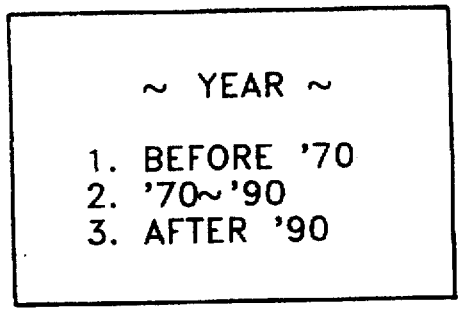
FIG. 31B shows a YEAR menu displayed by the CD-OK reproducing apparatus during the menu mode.

When the numerical key "2" is depressed while the CLASSIFICATION menu is displayed, the YEAR menu shown in FIG. 31B is displayed on the screen. The YEAR feature instructs the reproduction apparatus to randomly select songs based on the time period during which the song was reproduced. For instance, as illustrated in the figure, the YEAR menu contains a (1) BEFORE 1970 category, a (2) 1970 TO 1990 category, and an (3) AFTER 1990 category.

Figure 31E:
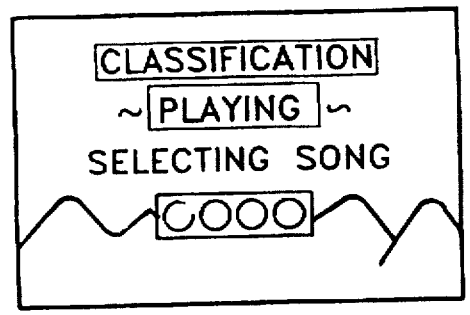
FIG. 31E shows other information displayed by the CD-OK reproduction apparatus when the CLASSIFICATION feature has been selected.
Figure 31C:
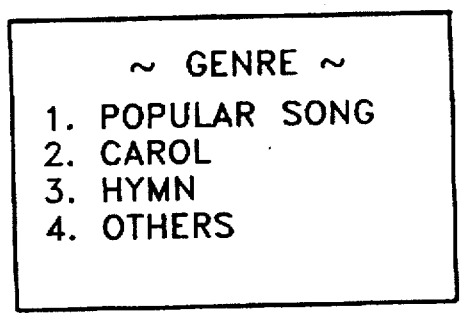
FIG. 31C shows a GENRE menu displayed by the CD-OK reproducing apparatus during the menu mode.

When the numerical key "3" is depressed while the CLASSIFICATION menu is displayed, the GENRE menu shown in FIG. 31C is displayed on the screen. The GENRE feature instructs the reproduction apparatus to randomly select songs based on the theme of the song. For instance, as illustrated in the figure, the GENRE menu contains a (1) POPULAR SONG option, a (2) CAROL option, a (3) HYMN option, and an (4) OTHERS option.

When the numerical key "4" is depressed while the CLASSIFICATION menu is displayed, the reproduction apparatus is instructed to randomly select all types of songs without taking into consideration any of the categories above.

Based on the configuration above, if the user selects the CLASSIFICATION category from the main menu, selects a category (e.g. the (2) YEAR category) from the CLASSIFICATION menu, and selects a category (e.g. the (1) BEFORE 1970 category) from the YEAR menu, the image illustrated in FIG. 31D is shown on the screen of the monitor. In particular, the reproduction apparatus displays the phrase PLEASE PUSH THE PLAYBACK BUTTON on the screen. Furthermore, the reproduction apparatus randomly scrolls through the index numbers 58 listed in the music index table 35 which relate to songs that have been produced before 1970, and the scrolling index numbers 58 are displayed in a scrolling number window 1500 on the screen.

After the user presses the reproduction key, the random scrolling of numbers stops, and the song which corresponds to the final index number 58 displayed in the scrolling number window 1500 is the song which is reproduced by the reproduction apparatus. Subsequently, when the randomly selected song is being played, the reproduction apparatus displays the information illustrated in FIG. 31E on the screen.

After the randomly selected song has been reproduced, the reproduction apparatus again scrolls through the list of index numbers 58 and randomly selects another song. The above random selection feature is continually repeated until the user inputs a stop command.

As described above, the CD-OK reproducing apparatus of the present invention can reproduce music information and background images from compact discs which are able to store thousands of songs and a variety of background pictures. As a result, a user does not have to purchase a lot of expensive recording media to play many types of songs and does not have to be burdened by inserting and removing various recording media to and from the apparatus while the apparatus is operating.

Also, even though the background images comprise a plurality of still pictures, the currently displayed background image can be strategically replaced with a new background image to enhance the visual effect of the CD-OK reproducing apparatus. Moreover, the background images may also be randomly selected so that different background images may be displayed when the same song is selected at two different instances.

Also, the background images may be displayed based on the atmosphere or theme of the images. Thus, even though different background images may be displayed when the same portion of the same song is reproduced at different times, the atmosphere of each of the background images will still complement and coincide with the portion of song.

In addition, an external motion picture can be displayed as a background image so that the reproduction apparatus can perform two different functions. As a result, lyrical data or other subtitle data can be overlapped upon and synchronized with the external motion picture signal so that image distortion is prevented.

In addition, by implementing the menu mode, songs can be classified in various manners and can be reproduced based on a particular feature of the songs. Therefore, the user can easily select songs based on his or her own preferences.

Also, the apparatus can reproduce various kinds of CDs and can mix the reproducing functions of an audio CD or a graphics CD.

What is claimed is:

1. A CD video-song accompaniment apparatus which reproduces information from a compact disc and which comprises:

a CD reproducing portion which reads audio data from said compact disc and generates an audio signal if said compact disc is a first type of compact disc and which reads digital data from said compact disc if said compact disc is a second type of compact disc, wherein said digital data comprises background image data and music information data;

a CD-OK reproducing portion which inputs said digital data from said CD-reproducing portion and generates a first background image and a second background image based on said background image data and generates a CD-OK audio signal based on said music information data;

an audio selector which inputs said audio signal generated by said CD reproducing portion and said CD-OK audio signal generated by said CD-OK reproducing portion and which selectively outputs either said audio signal or said CD-OK audio signal; and a main controlling means for determining whether said compact disc is said first type of compact disc or said second type of compact disc, wherein said main controlling means instructs said audio selector to output said audio signal if said compact disc is said first type of compact disc and instructs said audio selector to output said CD-OK audio signal if said compact disc is said second type of compact disc.

2. The CD video-song accompaniment apparatus as claimed in claim 1, wherein said CD-OK audio signal represents musical sounds of a particular song, wherein said digital data further comprises lyrics data corresponding to lyrics of said particular song, wherein said CD-OK reproducing portion generates a first lyrical text signal corresponding to first lyrics of a first portion of said particular song and generates a second lyrical text signal corresponding to second lyrics of a second portion of said particular song based on said lyrics data, wherein said CD-OK reproducing portion outputs said first lyrical text signal along with said first background image and outputs said second lyrical text signal along with said second background image, and wherein a mood of said first background image corresponds to a mood of said first lyrics and a mood of said second background image corresponds to a mood of said second lyrics.

3. The CD video-song accompaniment apparatus as claimed in claim 2, wherein said second type of compact disc comprises a first data area for storing said background image data relating to said first background image and said second background image, a second data area for storing said music information data relating to said particular song, a first table area, and a second table area, wherein said first table area comprises a background image index table having a first background index number, a first background address associated with said first background index number, a second background index number, and a second background address associated with said second background index number, wherein said first background address identifies a first address location of said first data area at which said background image data relating to said first background image is located, and wherein said second background address identifies a second address location of said first data area at which said background image data relating to said second background image is located.

4. The CD video-song accompaniment apparatus as claimed in claim 3, wherein said music information data relating to said particular song comprises a background image sequence table which contains group information that corresponds to said first background index number and said second background index number, and wherein said CD-OK reproducing portion evaluates said group information to select said first background index number and said second background index number, wherein said CD-OK reproducing portion reads said first background address and said second background address from said background image index table based on said first background index number and said second background index number, and wherein said CD-OK reproducing apparatus respectively reads said background image data corresponding to said first background image and said second background image from said first address location and said second address location of said first data area based on said first background address and said second background address.

5. The CD video-song accompaniment apparatus as claimed in claim 4, further comprising:

a system memory, wherein said CD-OK reproducing portion stores said background image index table and said music information data in said system memory before said CD-OK reproducing portion generates said first background image and said second background image.

6. The CD video-song accompaniment apparatus as claimed in claim 1, wherein said CD reproducing portion reads video data from said compact disc and generates a video signal if said compact disc is said first type of compact disc, wherein said CD video-song accompaniment apparatus further comprises:

a video selector for selectively outputting said video signal output from said CD reproducing portion or said first and second background images from said CD-OK reproducing portion, and wherein said main controlling means instructs said video selector to output said video signal if said compact disc is said first type of compact disc and instructs said video selector to output said first and second background images if said compact disc is said second type of compact disc.

7. The CD video-song accompaniment apparatus as claimed in claim 1, wherein said CD-OK reproducing apparatus comprises:

a memory portion which stores at least a portion of said music information data and at least a portion of said background image data output from said CD reproducing portion;

a sound reproducing portion which inputs said portion of said music information data and generates said CD-OK audio signal based on said portion of said music information data;

microphone sound detecting means for detecting sounds input via a microphone;

a video reproducing portion which comprises a video memory for storing said portion of said background image data from said memory portion, wherein said video reproducing portion generates said first background image and said second background image based on said portion of said background image data;

a control signal portion which generates timing signals to synchronize functions of said CD-OK reproducing portion; and CD-OK controlling means for controlling at least one function of at least one of said memory portion, said sound reproducing portion, said microphone sound detecting means, said video reproducing portion, and said control signal portion.

8. The CD video-song accompaniment apparatus as claimed in claim 7, wherein said CD-OK reproducing apparatus comprises:

an external video input port which inputs an external video signal; and a superimposing means for inputting said external video signal from said external video input port and said first background image from said video reproducing portion and for superimposing said first background image and said external video signal to produce a superimposed signal.

9. The CD video-song accompaniment apparatus as claimed in claim 7, wherein said CD-OK reproducing portion further comprises an external video input port which inputs an external video signal, wherein said control signal portion comprises:

a first sync detector which separates an external composite sync signal from said external video signal when said external video signal is input to said external video input port; and a sync signal generator which generates an internal horizontal sync signal and a screen refresh address signal, wherein said internal horizontal sync signal is synchronized with said external composite sync signal when said external composite sync signal is output from said first sync detector and wherein said screen refresh address signal refreshes address locations of said video memory of said video reproducing portion.

10. The CD video-song accompaniment apparatus as claimed in claim 9, wherein said control signal portion further comprises:

a control signal generator which inputs said internal horizontal sync signal from said sync signal generator and said external composite sync signal from said first sync detector and generates a main clock signal based on said external composite sync signal and said internal horizontal sync signal.

11. The CD video-song accompaniment apparatus as claimed in claim 10, wherein said control signal generator contains a clock signal generator which comprises:

a horizontal sync separator which extracts an external horizontal sync signal from said external composite sync signal;

a phase difference detector which inputs said external horizontal sync signal from said horizontal sync separator and said internal horizontal sync signal from said sync signal generator and generates a phase difference detection signal based on a phase difference between said external horizontal sync signal and said internal horizontal sync signal; and a second sync detector which detects whether or not said external composite sync signal has been output from said first sync detector and generates a corresponding sync detection switching signal.

12. The CD video-song accompaniment apparatus as claimed in claim 11, wherein said clock signal generator further comprises:

a first oscillator which generates a first oscillation signal having a first frequency;

a second oscillator which generates a second oscillation signal having a second frequency;

a signal selector which inputs said first oscillation signal and said second oscillation signal and selectively outputs said first oscillation signal or said second oscillation signal as a selected oscillation signal, wherein said signal selector outputs said first oscillation signal as said selected oscillation signal if said sync detection switching signal indicates that said external composite sync signal has been output and outputs said second oscillation signal as said selected oscillation signal when said sync detection switching signal indicates that said external composite sync signal has not been output;

a gate means which inputs said phase difference detection signal and said sync detection switching signal, wherein said gate means outputs said phase difference detection signal when said sync detection switching signal indicates that said external composite sync signal has been output; and a frequency divider which divides a frequency of said selected oscillation signal to produce said main clock signal, wherein said frequency divider delays said main clock signal by said phase difference between said external horizontal sync signal and said internal horizontal sync signal when said gate means outputs said phase difference detection signal to said frequency divider.

13. The CD video-song accompaniment apparatus as claimed in claim 9, wherein said sync signal generator comprises:

a leading edge detector which inputs said external composite sync signal from said first sync detector, detects an edge of said external composite sync signal, and outputs a corresponding first edge detection signal;

an external sync input detector which inputs said first edge detection signal, determines whether or not said external composite sync signal has been input to said leading edge detector based on said first edge detection signal, and outputs an external sync input detecting signal which indicates whether or not said external composite sync signal has been input;

an external vertical sync detector which determines pulse widths of pulses of said external composite sync signal based on said first edge detection signal, detects edges of an external vertical sync signal based on said pulse widths, and generates a second edge detection signal based on said edges of said external vertical sync signal; and a field distinguisher which generates a field distinction signal by comparing an internal reference signal with said second edge detection signal, wherein said field distinction signal indicates whether a field is odd or even.

14. The CD video-song accompaniment apparatus as claimed in claim 13, wherein said sync signal generator further comprises:
- a horizontal sync generator which generates said internal horizontal sync signal, a horizontal blanking signal, a horizontal leading edge signal, and said internal reference signal in accordance with said main clock signal, wherein said horizontal leading edge signal represents leading edges of said internal horizontal sync signal;
- a vertical sync generator which generates an internal vertical sync signal, a vertical blanking signal, and an internal sync restoring signal based on said field distinction signal and said horizontal leading edge signal; and
- a signal mixer which mixes said internal horizontal sync signal and said internal vertical sync signal to generate an internal composite sync signal and which mixes said horizontal blanking signal and said vertical blanking signal to generate a blanking signal.

15. The CD video-song accompaniment apparatus as claimed in claim 14, wherein said sync signal generator further comprises:
- a sync signal selector which inputs said external composite sync signal and said internal composite sync signal and selectively outputs either said external composite sync signal or said internal composite sync signal based on said external sync input detecting signal from said external sync input detector.

16. The CD video-song accompaniment apparatus as claimed in claim 13, wherein said external sync input detector comprises:
- a first flip-flop which synchronizes said first edge detection signal output from said leading edge detector with said main clock signal and outputs a first synchronizing signal;
- a second flip-flop which synchronizes said internal sync restoring signal output from said vertical sync generator with said main clock signal and outputs a second synchronizing signal; and
- a third flip-flop which inputs said first synchronizing signal via a clear port and said second synchronizing signal via a clock port and outputs said external sync input detecting signal, wherein said third flip-flop outputs a low signal as said external sync input detecting signal when said first synchronizing signal clears said third flip-flop and wherein said third flip-flop outputs a high signal as said external sync input detecting signal when said first synchronizing signal does not clear said third flip-flop.

17. The CD video-song accompaniment apparatus as claimed in claim 13, wherein said external vertical sync detector comprises:
- a counter which counts said main clock signal to produce first counted values and which is reset by said first edge detection signal;
- a vertical sync pulse detector which inputs said first counted values from said counter, determines said pulse widths of said pulses of said external composite sync signal based on said first counted values, detects said edges of said external vertical sync signal based on said pulse widths, and generates said second edge detection signal based on said edges of said external vertical sync signal; and
- a first pulse generator which generates a vertical initial value loading signal based on said second edge detection signal, wherein said vertical sync generator inputs said vertical initial value loading signal to begin generating said internal vertical sync signal, said vertical blanking signal, and said internal sync restoring signal.

18. The CD video-song accompaniment apparatus as claimed in claim 13, wherein said field distinguisher comprises:
- a discriminator which generates an odd/even signal by comparing said internal reference signal with said second edge detection signal, wherein said odd/even signal indicates whether said field is odd or even;
- a selector which inputs said odd/even signal and said vertical blanking signal and selectively outputs either said odd/even signal or said vertical blanking signal as a selected discrimination signal based on said external sync input detecting signal, wherein said selector outputs said odd/even signal when said external sync input detecting signal indicates that said external composite sync signal has been input by said leading edge detector and wherein said selector outputs said vertical blanking signal when said external sync input detecting signal indicates that said external composite sync signal has not been input by said leading edge detector; and
- a second pulse generator which outputs said field distinction signal by synchronizing said selected discrimination signal with said main clock signal.

19. The CD video-song accompaniment apparatus as claimed in claim 7, wherein said video memory comprises:
- a first selector which selectively outputs either a first selection signal or a second selection signal as a chip selection signal in accordance with a first clock signal;
- a second selector which selectively outputs either a reading address signal or a writing address signal in accordance with said first clock signal; and
- a first image memory and a second image memory which store data in accordance with said writing address signal, said chip selection signal, and a write control signal and which output data in accordance with said reading address signal and said chip selection signal.

20. The CD video-song accompaniment apparatus as claimed in claim 19, wherein said video memory further comprises:
- a first data transmission gate which transfers data from a first data bus to a second bus based on said first clock signal;
- a second data transmission gate which transfers data from said first data bus to a third data bus based on said first clock signal;
- a first bi-directional transmission gate which transfers data from said second data bus to said first image memory and transfers data from said first image memory to said second data bus based on said first clock signal; and
- a second bi-directional transmission gate which transfers data from said third data bus to said second image memory and transfers data from said second image memory to said third data bus based on said first clock signal.

21. The CD video-song accompaniment apparatus as claimed in claim 20, wherein said video memory further comprises:
- a first latch which latches data on said second data bus as first latched data and outputs said first latched data to a fourth data bus based on a second clock signal;

a second latch which latches data on said third data bus as second latched data and outputs said second latched data to said fourth data bus based on said second clock signal and a third clock signal such that said first latched data and said second latched data are alternatively output to said fourth data bus; and an output transmission gate which outputs data from said fourth data bus as said portion of said background data.

22. The CD video-song accompaniment apparatus as claimed in claim 7, wherein said video reproducing portion comprises:

a signal synthesizer which inputs said portion of said background image data from said video memory and generates R, G, and B signals; and a video converter which converts said R, G, and B signals into said first background image and said second background image.

23. The CD video-song accompaniment apparatus as claimed in claim 22, wherein said video converter comprises:

an RGB matrix which inputs said R, G and B signals and generates a corresponding luminance signal, first color difference signal, and second color difference signal;

a luminance signal amplifier which amplifies said luminance signal into an amplified luminance signal;

a first modulator for modulating said first color difference signal into a first modulated color signal;

a second modulator for modulating said second color difference signal into a second modulated color signal;

a first mixer which mixes said first and second modulated color signals to produce a carrier color signal; and a second mixer which mixes said carrier color signal, said amplified luminance signal, and a composite sync signal to produce said first and second background images.

24. The CD video-song accompaniment apparatus as claimed in claim 8, wherein said video reproducing portion comprises:

a signal synthesizer which inputs said portion of said background image data from said video memory and generates R, G, and B signals; and a video converter which converts said R, G, and B signals into said first background image and said second background image, wherein said video converter comprises:

an RGB matrix which inputs said R, G and B signals and generates a corresponding luminance signal, first color difference signal, and second color difference signal;

a luminance signal amplifier which amplifies said luminance signal into an amplified luminance signal;

a first modulator for modulating said first color difference signal into a first modulated color signal;

a second modulator for modulating said second color difference signal into a second modulated color signal;

a first mixer which mixes said first and second modulated color signals to produce a carrier color signal; and a second mixer which mixes said carrier color signal, said amplified luminance signal, and a composite sync signal to produce said first and second background images.

25. The CD video-song accompaniment apparatus as claimed in claim 24, wherein said superimposing means comprises:

an attenuator which attenuates said external video signal to produce an attenuated video signal;

an image signal selector which inputs a video selection control signal from said video memory, said first and second background images from said second mixer, and said attenuated video signal from said attenuator, wherein said image signal selector selectively outputs either said attenuated video signal or said first and second background images as a selected video signal based on said video selection control signal; and an output amplifier for amplifying said selected video signal.

26. The CD video-song accompaniment apparatus as claimed in claim 25, wherein said video converter further comprises:

a first compensator which compensates a phase of said first modulated color signal in accordance with a first phase control signal to produce a first compensated modulated color signal, wherein said first compensated modulated color signal is output to said first mixer;

a second compensator which compensates a phase of said second modulated color signal in accordance with a second phase control signal to produce a second compensated modulated color signal, wherein said second compensated modulated color signal is output to said first mixer;

a phase matching portion which generates said first and second phase control signals to synchronize a color burst signal and said R, G, and B signals by phase-locking a first color carrier and a second color carrier wave while said superimposing means superimposes said first background image with said external video signal.

27. The CD video-song accompaniment apparatus as claimed in claim 7, wherein said sound reproducing portion comprises:

a MIDI data transmitter which inputs said portion of said music information data from said memory portion and converts said portion of said music information data into MIDI data;

a sound source processor which inputs said MIDI data and generates song accompaniment data based on said MIDI data; and an audio converter which inputs said song accompaniment data and converts said song accompaniment data into said CD-OK audio signal.

28. The CD video-song accompaniment apparatus as claimed in claim 27, wherein said MIDI data transmitter comprises:

a first input latch which inputs parallel time data and a first input enable signal from said CD-OK controlling means and latches said parallel time data as latched parallel time data based on said first input enable signal;

transmission clock generating means for inputting said latched parallel time data and for generating a transmission clock signal by counting a system clock signal output from said CD-OK controlling means, wherein said transmission clock generating means begins counting from a value of said latched parallel time data;

a second input latch which inputs parallel transmission data and a second enable signal from said CD-OK controlling means and latches said parallel transmission data as latched parallel transmission data based on said second input enable signal, wherein said parallel transmission data is a segment of said portion of said music information data;

output selection signal generating means for counting pulses of said transmission clock signal to produce selection count values, wherein said output selection signal generating means is set to a predetermined value by said second enable signal and wherein said selection count values are output by said output selection signal generating means as an output selection signal; and a parallel-to-serial converter which inputs said output selection signal and converts said latched parallel transmission data into a serial data signal based on said output selection signal, wherein said serial data signal is output as said MIDI data.

29. The CD video-song accompaniment apparatus as claimed in claim 28, wherein said MIDI data transmitter further comprises:

transmission end signal generation means for generating a transmission end signal based on said output selection signal.

30. The CD video-song accompaniment apparatus as claimed in claim 28, wherein said transmission clock generating means comprises:

a programmable counter which inputs said latched parallel time data as an initial value and counts pulses of said system clock signal beginning with said initial value, wherein said programmable counter reloads said latched parallel time data as said initial value when said programmable counter generates a carry signal; and a flip-flop which generates said transmission clock signal by synchronizing said carry signal with said system clock signal.

31. The CD video-song accompaniment apparatus as claimed in claim 29, wherein said transmission end signal generation means comprises:

a gate circuit which inputs said output selection signal and generates a gate signal if a value said output selection signal equals a certain value; and a flip-flop which generates said transmission end signal by synchronizing said gate signal with said system clock signal.

32. The CD video-song accompaniment apparatus as claimed in claim 31, wherein said output selection signal generating means comprises:

an AND gate which inputs said transmission clock signal and outputs said transmission clock signal based on said gate signal; and a selection signal counter which is set to said predetermined value by said second enable signal and outputs said selection count values as said output selection signal.

33. The CD video-song accompaniment apparatus as claimed in claim 28, wherein said parallel-to-serial converter comprises a 16-to-1 multiplexer.

34. The CD video-song accompaniment apparatus as claimed in claim 7, wherein said microphone sound detecting means comprises:

input detecting means for inputting said sounds input via said microphone and outputting a high frequency oscillating signal when a level of said sounds is substantially equal to a predetermined threshold level;

waveform converting means for inputting said high frequency oscillating signal and generating a rectangular wave signal which has a pulse width which is substantially equal to a pulse width of said high frequency oscillating signal; and a transmission gate which outputs said rectangular wave signal to said CD-OK controlling means in response to a microphone control signal output from said control means.

35. The CD video-song accompaniment apparatus as claimed in claim 7, further comprising:

a display, wherein said music information data comprises lyrics data corresponding to lyrics of a particular song, wherein said video reproducing portion generates a first lyrical text signal corresponding to first lyrics of a first portion of said particular song and generates a second lyrical text signal corresponding to second lyrics of a second portion of said particular song based on said lyrics data, wherein said video reproducing portion outputs said first lyrical text signal along with said first background image and outputs said second lyrical text signal along with said second background image, wherein said CD-OK audio signal represents musical sounds of said particular song and comprises first and second musical sounds respectively corresponding to said first and second portions of said particular song, wherein said sound reproducing portion outputs said first musical sounds when said video reproducing portion outputs said first lyrical text signal and outputs said second musical sounds when said video reproducing portion outputs said second lyrical text signal, and wherein said display inputs said first and second lyrical text signals and respectively displays said first and second lyrics in accordance with said first and second lyrical text signals.

36. The CD video-song accompaniment apparatus as claimed in claim 35, wherein said video reproducing portion outputs said first lyrical text signal such that a portion of said first lyrics displayed on said display change color to instruct a user of said CD video-song accompaniment apparatus to sing said portion of said first lyrics at a time which coincides with a corresponding portion of said first musical sounds, and wherein said video reproducing portion outputs said second lyrical text signal such that a portion of said second lyrics displayed on said display changes color to instruct said user to sing said portion of said lyrics at a time which coincides with a corresponding portion of said second musical sounds.

37. The CD video-song accompaniment apparatus as claimed in claim 36, wherein said CD-OK controlling means comprises:

speed determining means for determining a speed at which a first portion of said first lyrics should be sung by said user;

sampling means for sampling said sounds input by said microphone sound detecting means when said first portion of said first lyrics changes color;

singing determining means for determining if said sounds sampled by said sampling means indicate that said user sang said first portion of said first lyrics when said first portion of said first lyrics changed color; and scoring means for calculating a score representing how well said user sang said particular song based on whether or not said user sang said first portion of said first lyrics when said first portion of said first lyrics changed color.

38. The CD video-song accompaniment apparatus as claimed in claim 37,
   wherein said speed determining means sets a first count value to a first predetermined value before said first portion of said first lyrics changes color, and
   wherein said singing determining means increments said first count value when said user sings said first portion of said first lyrics substantially at a time when said first portion of said first lyrics changes color.

39. The CD video-song accompaniment apparatus as claimed in claim 38,
   wherein said speed determining means sets a second count value to a second predetermined value before said first portion of said first lyrics changes color,
   wherein said sampling means increments said second count value when said first portion of said first lyrics changes color, and
   wherein said scoring means for calculates said score based on said first count value and said second count value.

40. The CD video-song accompaniment apparatus as claimed in claim 39, wherein said scoring means calculates said score based on a ratio of said first count value and said second count value.

41. The CD video-song accompaniment apparatus as claimed in claim 37, wherein said CD-OK controlling means further comprises:
   a fanfare sound outputting means for instructing said sound reproducing portion to generate and output a fanfare sound when said score is greater than a predetermined score.

42. The CD video-song accompaniment apparatus as claimed in claim 37, wherein said CD-OK controlling means further comprises:
   a score displaying means for displaying said score on said display.

43. The CD video-song accompaniment apparatus as claimed in claim 42, wherein said CD-OK controlling means further comprises:
   a fanfare sound outputting means for instructing said sound reproducing portion to generate and output a fanfare sound when said score is greater than a predetermined score.

* * * * *